US009800903B2

(12) United States Patent
Sze et al.

(10) Patent No.: US 9,800,903 B2
(45) Date of Patent: Oct. 24, 2017

(54) SYSTEMS, DEVICES AND METHODS FOR DISTRIBUTING DATA WITH MULTI-TIERED ENCODING

(71) Applicant: DEJERO LABS INC., Waterloo (CA)

(72) Inventors: David Sze, Waterloo (CA); Cameron Kenneth Smith, Oakville (CA); Todd Schneider, Waterloo (CA); Bogdan Frusina, Kitchener (CA)

(73) Assignee: Dejero Labs Inc., Waterloo (CA)

( * ) Notice: Subject to any disclaimer, the term of this patent is extended or adjusted under 35 U.S.C. 154(b) by 7 days.

(21) Appl. No.: 15/095,002

(22) Filed: Apr. 8, 2016

(65) Prior Publication Data

US 2016/0301960 A1     Oct. 13, 2016

Related U.S. Application Data

(60) Provisional application No. 62/145,363, filed on Apr. 9, 2015.

(51) Int. Cl.
*H04N 7/173* (2011.01)
*H04N 21/222* (2011.01)
(Continued)

(52) U.S. Cl.
CPC ..... *H04N 21/222* (2013.01); *H04N 21/23805* (2013.01); *H04N 21/2402* (2013.01); *H04N 21/6373* (2013.01); *H04N 21/6379* (2013.01)

(58) Field of Classification Search
CPC ............ H04N 21/812; H04N 21/6125; H04N 21/47202; H04N 21/235; H04N 21/435;
(Continued)

(56) References Cited

U.S. PATENT DOCUMENTS 6,345,303 B1 * 2/2002 Knauerhase ........ H04L 67/1008
707/999.01
6,407,680 B1    6/2002 Lai et al.
(Continued)

OTHER PUBLICATIONS

International Searching Authority, International Search Report and Written Opinion dated Jun. 15, 2016, issued in International Application No. PCT/CA2016/050410.

*Primary Examiner* — Annan Shang
(74) *Attorney, Agent, or Firm* — Norton Rose Fulbright Canada LLP

(57) ABSTRACT

Systems, devices, methods, and computer readable media are provided for distributing data with multi-tiered encoding. For example, a system for transmission of data streams to endpoints is provided that includes: encoders, each encoder configured to encode a data stream according to at least one encoding parameter; virtual transmitters organized into groups based on at least one transmission characteristic; each group of virtual transmitters configured to receive encoded data from an associated one of the encoders; each virtual transmitter of the plurality of virtual transmitters configured to transmit the encoded data to an associated one of the plurality of endpoints; and at least one controller configured to monitor transmission characteristics of the plurality of virtual transmitters and to adjust membership of the virtual transmitters in the plurality of groups based on the monitored transmission characteristics. The system may be further configured for synchronization, uni/bi-directional communication, etc.

20 Claims, 12 Drawing Sheets

(51) Int. Cl.
*H04N 21/24* (2011.01)
*H04N 21/6379* (2011.01)
*H04N 21/6373* (2011.01)
*H04N 21/238* (2011.01)

(58) Field of Classification Search
CPC .......... H04N 7/17318; H04N 7/17336; H04N 7/165; H04N 7/173
USPC .............. 725/93–116; 709/217–232
See application file for complete search history.

(56) References Cited

U.S. PATENT DOCUMENTS

| | | | | |
|---|---|---|---|---|
| 6,795,506 | B1* | 9/2004 | Zhang | H04L 12/5693 348/390.1 |
| 7,352,796 | B1* | 4/2008 | von der Embse | H04J 13/0048 375/146 |
| 8,180,915 | B2* | 5/2012 | Zhao | H04N 21/2662 375/240.12 |
| 8,352,992 | B1* | 1/2013 | Patti | H04N 21/23439 725/105 |
| 8,421,840 | B2* | 4/2013 | Eleftheriadis | H04N 7/152 348/14.07 |
| 8,471,890 | B1* | 6/2013 | Golas | H04N 7/15 348/14.08 |
| 8,621,544 | B2* | 12/2013 | Li | G06T 7/0002 715/723 |
| 9,002,991 | B2 | 4/2015 | Fletcher | |
| 9,578,288 | B2* | 2/2017 | Chen | H04N 7/17318 |
| 2002/0041570 | A1* | 4/2002 | Ptasinski | H04L 1/0003 370/252 |
| 2006/0050623 | A1* | 3/2006 | Hartman | H04L 1/0003 370/204 |
| 2009/0252247 | A1* | 10/2009 | Lee | H04B 7/0417 375/267 |
| 2010/0023635 | A1* | 1/2010 | Labonte | H04L 12/2602 709/231 |
| 2010/0043044 | A1* | 2/2010 | Li | G06T 7/0002 725/118 |
| 2011/0119565 | A1* | 5/2011 | Chang | H03M 13/1515 714/776 |
| 2011/0149833 | A1* | 6/2011 | Kozica | H04L 12/1877 370/312 |
| 2012/0124633 | A1* | 5/2012 | Lu | H04N 21/2343 725/114 |
| 2012/0201198 | A1* | 8/2012 | Turanyi | H04W 8/082 370/328 |
| 2013/0254386 | A1* | 9/2013 | Kim | G06F 15/173 709/224 |
| 2013/0343450 | A1 | 12/2013 | Solka et al. | |
| 2014/0059167 | A1* | 2/2014 | Gopalan | H04W 28/10 709/217 |
| 2014/0096168 | A1* | 4/2014 | Song | H04N 21/4122 725/93 |
| 2015/0016563 | A1* | 1/2015 | Mahdavifar | H04L 1/0075 375/295 |
| 2015/0229989 | A1* | 8/2015 | Gavade | H04N 19/46 725/31 |
| 2015/0230003 | A1* | 8/2015 | Shaw | H04L 65/602 725/109 |
| 2016/0112267 | A1* | 4/2016 | Miller | H04L 45/121 709/223 |
| 2016/0164935 | A1* | 6/2016 | Chen | H04L 1/1877 709/219 |

* cited by examiner

SYSTEMS, DEVICES AND METHODS FOR DISTRIBUTING DATA WITH MULTI-TIERED ENCODING

CROSS REFERENCE

This application is a non-provisional of, and claims all benefit to, including priority to, U.S. Application No. 62/145,363 filed Apr. 9, 2015 and entitled "SYSTEMS DEVICES AND METHODS FOR DISTRIBUTING DATA WITH MULTI-TIERED ENCODING", incorporated herein by reference.

FIELD

The disclosure relates generally to data communications, and more particularly to systems, devices, methods and computer program products for data communication to and from but not limited to video transmitters and receivers.

BACKGROUND

Transmission of live video or other data from one location to multiple endpoints is a common issue across a number of industries. From broadcast quality live shots that need to be transmitted to numerous television stations across a wide geography to security or emergency scene information that needs to be available to a variety of users including first responders and control center staff, a cost effective and reliable manner in which to transfer this information may be desirable.

Some of the receiver endpoints (e.g., a TV studio) may have various stated requirements for incoming video quality and latency, or may have challenges in receiving high quality, low latency video due to inadequate or inconsistent transmission networks.

SUMMARY

In an aspect, there is provided a system for transmission of data streams to a plurality of endpoints, the system comprising: a plurality of encoders, each encoder configured to encode a data stream according to at least one encoding parameter; a plurality of virtual transmitters organized into a plurality of groups based on at least one transmission characteristic; each group of virtual transmitters configured to receive encoded data from an associated one of the encoders; each virtual transmitter of the plurality of virtual transmitters configured to transmit the encoded data to an associated one of the plurality of endpoints; and at least one controller configured to monitor transmission characteristics of the plurality of virtual transmitters and to adjust membership of the virtual transmitters in the plurality of groups based on the monitored transmission characteristics.

In another aspect, at least two of the groups correspond to ranked tiers, ranked according to the at least one transmission characteristic.

In another aspect, the at least one controller is configured to adjust the membership of the virtual transmitters in the plurality of groups, the at least one controller being configured to: upon a determination that a group membership adjustment condition has been triggered, determine a new group for a target virtual transmitter that is currently a member of a current group, the new group based on the monitored transmission characteristics; determine whether a current frame number being processed by the current group matches a new frame number being processed by the new group; generate and transmit a control signal to an encoder corresponding to the new group requesting provisioning of the target virtual transmitter as a member of the new group; request a key frame from the encoder corresponding to the new group; and upon a determination that the current frame number does not match the new frame number, generate or transmit one or more control signals to synchronize the target virtual transmitter to the encoder corresponding to the new group.

In another aspect, to synchronize the virtual transmitter when the current frame number is greater than the new frame number, the at least one controller is configured to: transmit a control signal to an encoder corresponding to the current group terminating membership of the target virtual transmitter and transmit a control signal to the virtual transmitter to discard frames provided by the encoder corresponding to the new group until frames provided by the encoder corresponding to the new group reach the current frame number.

In another aspect, to synchronize the virtual transmitter when the current frame number is less than the new frame number, the at least one controller is configured to: maintain membership of the target virtual transmitter in both the current group and the new group and store the frames provided by the encoder corresponding to the new group in a sorted queue until the frames provided by the encoder corresponding to current group match the earliest frame provided by the encoder corresponding to the new group, upon which the at least one controller is configured to transmit a control signal to the encoder corresponding to the current group terminating membership of the target virtual transmitter and to transmit a control signal to the virtual transmitter to process the frames stored in the sorted queue.

In another aspect, each encoder of the plurality of encoders is configured to encode the data stream according to a lowest transmission characteristic among the plurality of virtual transmitters that are members of the group corresponding to the encoder.

In another aspect, the at least one controller is configured to monitor load conditions, each load condition associated with an encoder of the plurality of encoders, and upon detecting load conditions greater than a predetermined load condition value, to provision a new encoder and a corresponding new group, and to adjust membership of the virtual transmitters in the plurality of groups such that the virtual transmitters are distributed substantially evenly amongst the plurality of groups.

In another aspect, the system further includes a decoder configured to decode data received from a data source, and to provide the decoded data to each of the plurality of encoders.

In another aspect, the system further includes a plurality of decoders, each associated with at least one of plurality of encoders, each of the decoders configured to decode data received from a data source, and to provide the decoded data to the associated encoders.

In another aspect, the at least one transmission characteristic comprises at least one of: a bitrate, a latency, an encoding error rate relative to individual encoding, a structural similarity metric, a picture similarity index, and a packet loss rate.

In another aspect, there is provided a computer-implemented method for transmission of data streams to a plurality of endpoints, the method comprising: monitoring, by at least one controller, transmission characteristics of a plurality of virtual transmitters; and adjusting membership of the virtual transmitters in a plurality of groups based on the monitored transmission characteristics; wherein a plurality of encoders are each configured to encode a data stream according to at least one encoding parameter, and the plurality of virtual transmitters are organized into the plurality of groups based on at least one monitored transmission characteristic; wherein each group of virtual transmitters is configured to receive encoded data from an associated one of the encoders; and each virtual transmitter of the plurality of virtual transmitters is configured to transmit the encoded data to an associated one of the plurality of endpoints.

In another aspect, at least two of the groups correspond to ranked tiers, ranked according to the at least one transmission characteristic.

In another aspect, adjusting the membership of the virtual transmitters in the plurality of groups, further includes: upon a determination that a group membership adjustment condition has been triggered, determining a new group for a target virtual transmitter that is currently a member of a current group, the new group based on the monitored transmission characteristics; determining whether a current frame number being processed by the current group matches a new frame number being processed by the new group; generating and transmitting a control signal to an encoder corresponding to the new group requesting provisioning of the target virtual transmitter as a member of the new group; requesting a key frame from the encoder corresponding to the new group; and upon a determination that the current frame number does not match the new frame number, generating or transmitting one or more control signals to synchronize the target virtual transmitter to the encoder corresponding to the new group.

In another aspect, to synchronize the virtual transmitter when the current frame number is greater than the new frame number, the method further includes: transmitting a control signal to an encoder corresponding to the current group terminating membership of the target virtual transmitter and transmitting a control signal to the virtual transmitter to discard frames provided by the encoder corresponding to the new group until frames provided by the encoder corresponding to the new group reach the current frame number.

In another aspect, to synchronize the virtual transmitter when the current frame number is less than the new frame number, the method further includes: maintaining membership of the target virtual transmitter in both the current group and the new group; storing the frames provided by the encoder corresponding to the new group in a sorted queue until the frames provided by the encoder corresponding to current group match the earliest frame provided by the encoder corresponding to the new group; when the frames provided by the encoder corresponding to current group match the earliest frame provided by the encoder corresponding to the new group, transmitting a control signal to the encoder corresponding to the current group terminating membership of the target virtual transmitter; and transmitting a control signal to the virtual transmitter to process the frames stored in the sorted queue.

In another aspect, each encoder of the plurality of encoders is configured to encode the data stream according to a lowest transmission characteristic among the plurality of virtual transmitters that are members of the group corresponding to the encoder.

In another aspect, the method further includes: monitoring load conditions, each load condition associated with an encoder of the plurality of encoders; and upon detecting load conditions greater than a predetermined load condition value, provisioning a new encoder and a corresponding new group, and adjusting membership of the virtual transmitters in the plurality of groups such that the virtual transmitters are distributed substantially evenly amongst the plurality of groups.

In another aspect, the method further includes: a decoder configured to decode data received from a data source, and to provide the decoded data to each of the plurality of encoders.

In another aspect, the method further includes: a plurality of decoders, each associated with at least one of plurality of encoders, each of the decoders configured to decode data received from a data source, and to provide the decoded data to the associated encoders.

In another aspect, the at least one transmission characteristic comprises at least one of: a bitrate, a latency, an encoding error rate relative to individual encoding, a structural similarity metric, a picture similarity index, and a packet loss rate.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
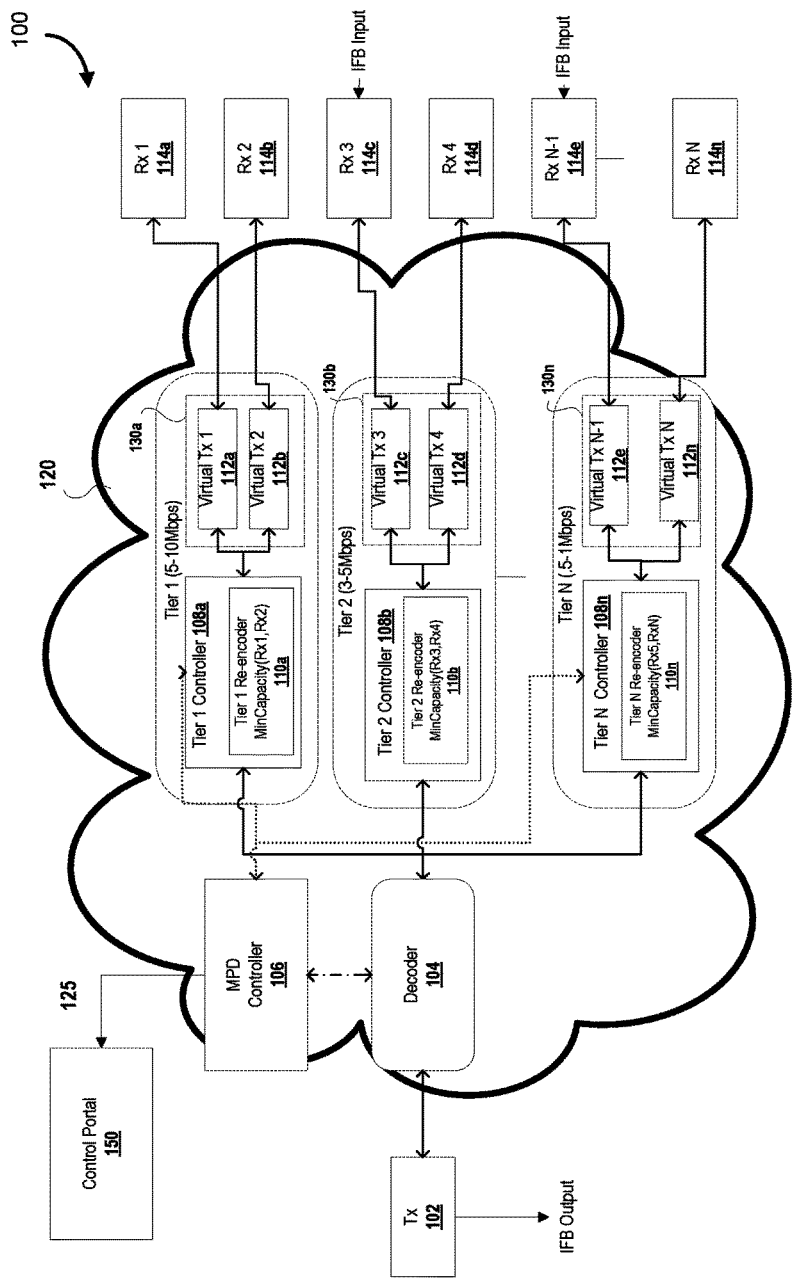
FIG. 1 is an example schematic diagram of a system with one multi-point distribution (MPD) node, according to some embodiments.

Embodiments of methods, systems, and apparatus suitable for use in implementation are described through reference to the drawings. The following discussion provides many example embodiments of the inventive subject matter.

Some solutions available on the market include individualized web streams which do not allow for adequate quality or consistency and which require excessive computation to generate the differing feeds, or costly dedicated data links between stations within a network or station group which do not allow for easily customizable sets of customers to receive the video or to interact with those producing it.

In some embodiments, a system is provided that facilitates communications between endpoints. There may be various types of endpoints: there may be endpoints which can receive (a receiver); endpoints which can transmit (a transmitter); and/or endpoints that may be capable of both transmitting and receiving, either separately or simultaneously (a transceiver).

Communicated signals may represent various forms of information, and may be analog and/or digital. The various forms of information may include media information (e.g., videos, audio, text, multimedia presentations, slide presentations, subtitles, 3D rendering information, and combinations thereof), metadata information (e.g., bookmarks, annotations, comments, parity), header information, etc. These sources may provide signals carrying information having various properties (e.g., analog, digital, compressed, scrambled, encrypted and/or decoded). The signals from the sources may also be associated with various error correction, handshaking, redundancy and/or encoding techniques that are used to improve information quality for signals travelling through unreliable or noisy communication channels.

While the transmission sources may primarily be transmitting the aforementioned information signals, there may also be information signals going in the reverse direction, such as those required for monitoring and cueing in a broadcast environment (e.g., interruptible foldback or "IFB").

The signals (both forward and reverse) may be transmitted through various communications media and topologies, such as the Internet, point-to-point linkages, intranets, peer-to-peer networks, etc. The signals may also be transmitted using various communications technologies, such as wired and/or wireless (e.g., microwave, Bluetooth™, cellular technologies).

Signals may include both frames carrying information, such as media information, and key frames used to indicate starting and ending points of various elements of information (e.g., a transition, a transmission). The key frames may include various types of key frames, such as i-frames, instantaneous decoder refresh (IDR)-frames, etc. Where one type of key frame is referred to in this specification, other types of key frames may also be utilized.

In some embodiments, the system may utilize one or more proxies for distributing information. For example these proxies may be configured to receive an encoded stream, and repeat it to one or more of other proxies and/or one or more decoders. The use of one or more proxies may depend on the size and/or scale of a deployment—for example, the proxies may help alleviate the load on cloud computing resources hosting multiple decoders, a source transmitter and/or on various communication links between the transmitter and/or the decoders. There may be layers of proxies (e.g., a master proxy feeding into one or more layers of intermediate proxies). The layers of proxies, in some embodiments, are organized as a hierarchy of proxies. The proxies may be controlled by one or more master controllers, or, for example, there may be one or more intermediate proxies that are controlled by intermediate controllers.

The proxies may be configured to provide other functionality, such as requesting missing information packets from the source, reconstructing missing information packets from the source based on forward error correction (FEC), transmitting the encoded information packets to each of the downstream components next in the hierarchy of proxies and/or decoders, handling retransmission of lost packets, forwarding key-frame on demand requests received from downstream components to the source, providing IFB capabilities (e.g., decoding IFB packets received from downstream components, mixing them into a single audio stream, re-encoding this stream, then sending it to the source), tracking load reported by downstream components, handling requests from the dispatcher (e.g., starting a virtual transmission to an endpoint/receiver, by delegating to a downstream computing resource in the hierarchy with the least load, adding another downstream computing resource, removing an empty downstream computing resource and transitioning an active stream from a level in the hierarchy to another).

A virtual transmitter may provide or interface with a communication link established between an endpoint and an encoder, the virtual transmitter being used for the transmission of information to/from the endpoint. The virtual transmitter may be uni-directional, or bi-directional, and the information may include content data, appended data (e.g., subtitles, logos, overlaid images), metadata, control data, signal data, error correction data, among others. The virtual transmitter may be provided, for example through a physical antenna array, a wired linkage, a cellular connection, a bonded connection, etc. The virtual transmitter may operate various channels and sub-channels, each having various transmission characteristics (e.g., throughput, latency, packet loss, encryption, protocol), among others. The virtual transmitter may be configured to communicate with one or more controllers, for example, communicating electronic signals representative of network transmission characteristics, endpoint characteristics, requested information signal characteristics, load conditions, operating conditions, among others.

As an illustrative, non-limiting example, "virtual" vs. "physical" may be considered from the point of view of a user of the system. For example, with a physical transmitter, the user owns a piece of equipment—the user plugs a video source (e.g. camera) into this equipment, assign it to a destination, and starts the transmission over any network connections attached to this equipment (e.g., cell modems, WiFi, ethernet, etc.).

For a virtual transmitter, the user may not see/own a particular piece of hardware but rather, in some embodiments, the service may be run in the cloud or using distributed resources, where the video source is not direct (like a camera), but instead, is an indirect source (such as a live feed from a physical transmitter, or a file on disk (or other media)). Transmission occurs over network connections that exist to the cloud server (or distributed resources) on which the virtual transmitter runs on.

The virtual transmitter may send signals that are analog and/or digital in nature, that may incorporate the usage of various signal compression/encoding (e.g., multiplexing/simplex signals, duplexing, time division, frequency division, code division, modulation), redundancy (e.g., sending parity checks and/or cloned signals), and/or error encoding/correction techniques (e.g., handshakes, echo cancellation). These signals may be transmitted over the one or more communication links.

In some embodiments, the virtual transmitter is configured to receive or generate control commands, including, for example, coded instruction sets, machine-level instructions, object code, etc. These control commands may be sent to the controller or an encoder, or received from the controller or the encoder, such that the virtual transmitter operating characteristics are modified. For example, the virtual transmitter may be adapted for providing a link between the endpoint and the encoder, and the virtual transmitter may be configured to establish linkages, break linkages, with or two endpoints and encoders. For example, the virtual transmitter may receive a control instruction set requesting the virtual transmitter to break a connection with a first encoder in favour of a second encoder where the virtual transmitter is moving from one encoding group (e.g., tier) to another.

The system may include one or more bonding components configured to bond communication links to form a bonded communication link. Communication links may be bonded in manners similar to that described in U.S. Pat. No. 8,873,560 to Frusina and Horvath (hereinafter referred to as the '560 patent) or in U.S. Pat. No. 8,984,576 to Sze et al. (hereinafter referred to as the '576 patent), the contents of both are hereby incorporated by reference. For example, the system may split data communication into multiple data streams transmitted in disassembled form over multiple communication links by way of multiple radio frequency (RF) interfaces (e.g., modems). Such disassembly may include, for example, transmitting packets from one data source over multiple RF interfaces, transmitting packets out of order, transmitting redundant packets, re-transmitting missing packets, computing and transmitting forward error correction (FEC) data, etc. The system may also include one or more complimentary de-bonding components configured to allow data communications over a bonded communication link to be re-assembled or otherwise reconstituted for use once transmitted through a bonded link. Such re-assembly may include, for example, re-ordering data packets, reassembling data packets, re-requesting missing data packets, re-computing missing packets based on FEC data, etc.

In some embodiments, the signals for transmission may be encoded/transcoded and/or otherwise transformed, for example, the signals may be modulated based on a specific encoding scheme (e.g., using various codecs, amplitude modulation, frequency modulation, code-division multiple access schemes, frequency division multiple access schemes, time division multiple access schemes, quadrature phase shift keying schemes), encrypted (e.g., using public/private key pairs), scrambled, filtered, digitized, enhanced, degraded, compressed, etc. Additional information (e.g., logos, advertisements, timestamps, geocoding, audio or graphical overlays) may be appended to or merged into the signals for various purposes.

In a first embodiment, a system is provided for receiving signals from the first set of one or more endpoints, grouping the second set of one or more endpoints into one or more groups, and performing encoding of the received signals, wherein the encoding of the data is based on at least one of the characteristics of the group members. One or more encoders may be provisioned, at least one encoder for each of the groups, the encoders configured to encode the signal based on a minimum characteristic of the endpoints comprising the group.

According to some embodiments, a potential advantage of grouping the endpoints for encoding may be the reduction of the number of encoders and/or the processing required to encode the signals for use by the endpoints.

There may be various characteristics that may be used in determining groupings for endpoints, these characteristics including, for example, average bit rate, minimum bit rate, affiliated entities (e.g., these endpoints are to be branded with similar logos), geography, language (e.g., these endpoints require Spanish subtitles), accessibility (e.g., these endpoints require closed captioning), network component considerations (e.g., these endpoints are behind a firewall and/or these endpoints can only be reached using a specific port), latency, connection reliability, connection uptime, nature of connections between transmitters, encoders and endpoints (e.g., some linked via fibre, others via satellite), audio or video transmission format (e.g. adaptive or fixed bitrate, different encoding types), different audio components (e.g., Stereo vs. 5.1 Surround Sound), desired language of audio overlay (e.g., English or Spanish commentary), time requirements (e.g., these endpoints only broadcast from 6:30 PM-8:30 PM), media to be broadcast (e.g., these endpoints are audio-only feeds), security level (e.g., these endpoints are restricted from receiving certain metadata associated with the transmission or these endpoints may not receive video from certain locations, or these endpoints must be sent only encrypted transmissions), payment level (e.g. these endpoints are limited to certain bandwidth or time slices based on what they have purchased), etc.

The groupings may be segregated, ranked, and/prioritized. For example, the groups may be tiered or set out in tiers, (e.g., tier one is the set of endpoints having a bit rate of 10-50 Mbps, tier two is the set of endpoints having a bit rate of 3-10 Mbps, tier 3 is the set of endpoints having a bit rate of 0-3 Mbps). The order of the tiers may be important; in some embodiments of the system, preference may be given to a higher tier over a lower tier. Such preferences may change over time in response to various factors (e.g. a tier may take priority when the group of endpoints in that tier are scheduled for a prime-time news broadcast, but drop in priority outside of that time period). Groupings may also be across multiple dimensions, for example, an endpoint may be a member of one or more groups.

As an illustrative, non-limiting example, consider a scenario where there are 5 virtual transmitters, each currently sending at the following bitrates: VTx1: 1.5 Mbps, VTx2: 2.0 Mbps, VTx3: 3.5 Mbps, VTx4: 6.0 Mbps, and VTx5: 9.5 Mbps.

Without tiers, there would have to be sufficient computational processing required to re-encode the video at those 5 distinct bitrates. With tiers, the transmitters would be "binned" into groups—e.g., Tier1: 0-2.5 Mbps, Tier2: 2.5-5.0 Mbps, and Tier3: 5.0-10.0 Mbps. Tier1 would contain: VTx1, VTx2. Tier2 would contain: VTx3. Tier3 would contain: VTx4, VTx5. With tiers, computational processing is used to re-encode the video at only 3 distinct bitrates. Tiers may be, for example, specific groupings, and may be ranked, in some embodiments, or not ranked, in other embodiments. For example, tiers/groups may be established not just by speed, but by other factors, such as the requirement for uni/bidirectional content, error encoding, logos, subtitles, etc. Each of these factors may have computational processing impacts on the encoders, and may need to be taken into consideration in ensuring that a membership of the groups is established (or adjusted) to maintain a greater level of efficiency. For example, determining the membership of the groups may be performed at one time, periodically or continuously by the encoders and/or controller. While the base case is to group the virtual transmitters to reduce computational processing required relative to each virtual transmitter being encoded separately, in some embodiments, membership is derived taking into consideration the quality of service delivered to each virtual transmitter (e.g., how good of a 'fit' a particular group is, the aggregate amount of encoding resources required for encoding signals to the virtual transmitters, the total amount of encoding resources available).

The membership of the groups may also be dynamic. For example, the endpoints comprising a group may adapt over time for various reasons, such as changing network conditions, changing demand requirements, changing resource availability, scheduling, payment for on-demand access to a feed, etc.

In some embodiments, the groupings may be provided (e.g., from an external system or from the endpoints themselves). In some embodiments, the groupings may be determined by the system, using information such as sensed real-time information (e.g., using a network monitoring component), historical information, predicted information, endpoint characteristic information (such as but not limited to location, payment status, security clearance level), etc.

In some embodiments, membership of endpoints in various groups may be determined by the system, and the system may move one or more endpoints from one group to another group (e.g., the requirements of the endpoint indicate that the endpoint would be more efficiently served if it were a member of another group). In some embodiments, membership of endpoints in various groups may be determined by the endpoint, which, for example, may request a transfer from one group to another group.

In some embodiments, the system is configured for the determination of various aspects related to the grouping of endpoints, including the criteria used to determine membership into groups, the ranking and/prioritization of groups, the number of groups to be provisioned, the number of endpoints that should fall within a group, etc. The determination of aspects related to the grouping of endpoints may be conducted, for example, through the use of an optimization algorithm that optimizes various factors, such as delivery efficiency, overall cost, processing cycles, efficiency of encoding, efficiency of decoding, service levels, and/or various combinations of factors. For example, various factors may have weight co-efficients assigned to them such that a weighted aggregate of factors may be used in determining how groupings should be allocated. Grouping may be determined through the use of various rules, conditions, rules, triggers, etc.

The criteria may include the total amount of resources available for encoding. For example, computing resources may be finite and shared amongst a larger pool of resources where some resources are used for other functions (e.g., news-casting, other signal transmissions) and the resources available may also be dynamic. The system may be configured for load balancing or predicting computational resources availability, and the groupings may be established to ensure that encoding activities are a good fit for the amount of resources available (or predicted to be available). For example, if a period of reduced resources is expected, the system may proactively group the virtual transmitters (e.g., adjusting membership to reduce the number of groups) such that encoding load is reduced. Conversely, if a period of available resources is expected, the system may proactively group the virtual transmitters (e.g., adjusting membership) such that encoding load is increased (e.g., more granular groups) and the virtual transmitters may receive a greater quality of service.

In some embodiments, other components may be utilized, such as decoders for decoding encoded source signals, virtual transmitters (that may be associated with one or more endpoints for the transmission of signal to these one or more endpoints), controllers (e.g., for load balancing), etc.

In some embodiments, the methods and systems described in this specification may be used, for example, in conjunction with a multi-viewer system as described in U.S. patent application Ser. No. 14/329,112 (published as US20150020135A1 to Frusina, hereinafter referred to as the '112 application), the contents of which are hereby incorporated by reference in its entirety.

In conjunction with this multi-viewer system, there may be various streams provided by transmitters, for delivery to endpoints/receivers (e.g., for viewing at and control by an endpoint/receiver). These streams may include various audio/video/metadata streams, preview streams, streams at various bitrates, etc. Streams from multiple transmitters may be transmitted in parallel to an endpoint/receiver for simultaneous viewing at the endpoint/receiver. In manners disclosed in the '112 application, a low bit rate/low frame rate preview stream may be provided to endpoints/receivers for preview purposes. Further, in manners disclosed in the '112 application, there may be provided an interface for selection and assignment of one or more streams for transmission to each endpoint/receiver. Some streams may be processed (e.g., decoded, encoded, transmitted, and operated on) in manners disclosed herein.

FIG. 1 is an example schematic diagram 100 of a system with one multi-point distribution (MPD) node 120, according to some embodiments.

As depicted, the MPD node 120 includes a decoder 104, an MPD controller 106, a plurality of tier controllers 108a . . . 108n, a plurality of re-encoders 110a . . . 110n, and a plurality of virtual transmitters 112a . . . 112n. The MPD node 120 is interconnected with a source transmitter 102, one or more receiver endpoints 114a . . . 114n, and a control portal 150.

Tier controllers 108a . . . 108n, re-encoders 110a . . . 110n, and virtual transmitters 112a . . . 112n are organized into group. Each group include one tier controller 108, one re-encoder 110, and a subset of the virtual transmitters 112a . . . 112n. Each of these subsets of virtual transmitters 112a . . . 112n may be referred to as a virtual transmitter block 130. The number of re-encoders 110a . . . 110n may be selected to optimize one or more variables tracked by the system. For example, the system may also be adapted to optimize the one or more variables and in some embodiments, may provision or de-provision re-encoders as required based on monitored supply, demand, and/or load conditions.

Decoder 104 decodes data received from transmitter 102 and provides the decoded data to the re-encoders 110a . . . 110n, each of which re-encodes the data under control of an associated tier controller 108. In some embodiments, there may be one or more tier re-encoders 110a . . . 110n that can sometimes operate as the "null" re-encoder. In these situations, decoder 104 may also operate as a "null" decoder, meaning the video/audio/metadata is passed through in its original form from transmitter 102 to one or more endpoints 114a . . . 114n.

Each of the re-encoders 110a . . . 110n provides re-encoded data to an associated virtual transmitter block 130 for transmission by the virtual transmitters 112a . . . 112n in that block 130. Each of the virtual transmitters 112a . . . 112n transmits re-encoded data to an assigned endpoint 114a . . . 114n.

In some embodiments, a transmitter 102 may be associated with an endpoint 114 by first assigning the transmitter 102 to the decoder 104 and then assigning a virtual transmitter 112 to the endpoint. In some embodiments, the assignment of a virtual transmitter 112 to an endpoint may be done in a manner that is transparent to an end user (e.g., at the endpoint).

For example, the end user may simply select a source transmitter 102 (e.g., by drag-and-drop setup of a source transmitter 102 to an endpoint 114). Thereafter, a virtual transmitter 112 is automatically selected for and paired with the endpoint 114, in some embodiments, through a double assignment whereby the transmitter 102 is assigned to the decoder 104, a virtual transmitter 112 is deployed or created on-the-fly and the output of the virtual transmitter 112 is assigned to the endpoint 114 where the source transmitter 102 was dragged.

In the example of FIG. 1, the groups of virtual transmitters 112 served by a common re-encoder 110 and controller 108 may be referred to as tiers.

Some of the controllers provided are configured to operate at the level of a tier, and may be referred to as tier controllers 108a . . . 108n. A MPD controller 106 may be provided in the MPD node 120 to manage the operations of the node 120. For example, an MPD controller 106 may be configured to define tiers, dynamically spin-up cloud compute resources as required, manage tiers (e.g. may override a tier controller 108 to manage number of virtual transmitters in a tier), manage the transfer of virtual transmitters 112 between tiers, handle interactions with a proxy (further described with reference to FIG. 3A-3C) and/or decoder 104, and with the transmitter 102 via the proxy, among others.

In some embodiments, a cloud server may also be associated with a tier, facilitating transmission to endpoints via a content distribution network (CDN) or similar that accepts the real time messaging protocol (RTMP), HTTP live streaming (HLS) or similar real time streaming protocols.

In some embodiments, the system is configured for handling error correction data, which may be separate from data content. For example, of the link between 112a and 114a might be perfect, so zero error correction would be required. Conversely, the link between 112b and 114b might be suffering from 5% loss, requiring 5% error correction. In both cases above the content is the same (as generated by the Tier1 re-encoder (110a), but the error correction data is different. Error correction data may be transmitted across the same or different channels. Where error correction data is transmitted on different channels of a communication link, in some embodiments, a faster channel (e.g., lower latency) is selected such that error correction is received faster such that corrupt (e.g., fails parity check)/missing (e.g., did not arrive on time)/malformed (e.g., header corrupted) data can be re-requested and actioned responsively (e.g., quickly).

The MPD controller 106 may interact with other components through, for example, sending control signals, the control signals indicating, for example, information on needed changes to tier parameters, information on virtual transmitters 112 that need to move into a new tier, and confirmations when a move is complete; to decoders or proxies, feedback on tiers (e.g. stop transmitting/decoding, as there is no longer any demand for the stream for a particular location). The MPD controller 106 may also be configured to send signals to receivers, for example, IFB control information indicating which receiver and/or component is in control of sending and receiving audio as well as status information (bandwidth usage, lost frames and other key performance parameters).

A control portal 150 may be provided to enable configuration and status monitoring of the MPD controller 106 (e.g., by way of MPD node control input 125). This may be implemented using a variety of approaches including, but not limited to a web application, a mobile application or a custom software application. The control portal may also be configured with and/or distributed with access and permissions controlled by user roles and log-on credentials.

In some embodiments, a separate IFB controller is provided that is configured to allow for the switching and management of IFB coming from a receiver endpoint 114 to the transmitter 102 as well as provide for switching and management of additional audio sources (e.g., a session initiation protocol (SIP) conference/dial-in service) that can be optionally used for IFB. The IFB controller can optionally be managed by the MPD controller 106. Configuration and status information for the IFB controller is handled by the control portal 150

Using the control portal 150, the MPD controller 106 may be configured by a user to determine the number of tiers required based on various criteria, such as cost, computing power needed, data bandwidth required and/or utilized and/or statistical analysis of historical transmission and reception characteristics for given devices or geographies. Tiers may be provided for various encoding requirements (e.g., bitrate ranges, bitrate consistency, encoding formats, information to be appended or overlaid to an incoming information flow).

There may be limits on the size of each tier (e.g., the number of transmitters) with both a minimum and a maximum, and the MPD controller 106 may be configured to manage the process of re-allocating virtual transmitters 112 between tiers, and/or dynamically changing the characteristics of tiers (e.g., additional resources have become available, increase the maximum number of virtual transmitters in a tier, data bandwidth allocation close to being exceed or already exceeded).

In some embodiments, the number of tiers may change dynamically. For example, tiers may be added to accommodate new transmitters (possibly in different locales with different decoder requirements) or collapsed to reduce computing and/or bandwidth cost. The addition or removal of tiers may be implemented based on monitored behaviour of the virtual transmitters, or other network condition characteristics using management criteria that are set via the control portal 150 or other system policy. The tier boundaries (e.g., 3-5 Mbps), may also change (e.g., to 3-6 Mbps)—for example, if the costs were fixed (e.g., limiting number of encoders), tier boundaries may be configured to fluctuate to best allow the virtual transmitters (or certain priority virtual transmitters/receivers within a pool) to operate closer to a desired level rather than move a virtual transmitter down to a tier with considerably lower performance. Tiers may also be de-provisioned and (re)provisioned to help manage costs. For example, where there are limited cloud computing resources and there is a desire to manage (e.g., maximize) the utilization of the cloud compute resources and/or data usage. Tiers may also be de-provisioned if the tier is idle for a pre-determined period of time, etc.

Tier controllers 108a . . . 108n may be configured to maintain and/or track the status of virtual transmitters 112a . . . 112n, and to dynamically, actively and/or passively adapt tier re-encoder 110a . . . 110n settings (e.g., based on an optimization rule), making various recommendations to a MPD controller 106 in relation to the movement and/or allocation of virtual transmitters as between tiers. For example, the tier controllers 108a . . . 108n may transmit signals indicating that a virtual transmitter needs to be assigned to a new tier given its performance (e.g., too slow, too fast, too unreliable), and may transmit a signal to the MPD controller 106 indicating that the virtual transmitter should be moved from one tier to another.

In this example, the source transmitter 102 ($T_x$) is a video source transmitter that supplies live video to an indeterminate number of receiver endpoints 114a . . . 114n ($R_1$ to $R_N$). This video may be transferred by various means, including but not limited to, transfer over a bonded communication link as described in the '560 patent or the '576 patent.

The source transmitter 102 may be transmitting an encoded signal that requires decoding. The source transmitter 102 may communicate information or otherwise interact with a decoder 104.

The decoder 104 may be configured for the following functionality: receiving the encoded information packets from an upstream component (e.g., a source transmitter 102, a master Proxy, or an Intermediate Proxy), requesting missing information packets from the upstream, reconstructing missing information packets from the upstream component based on error correction (e.g., forward error correction techniques), decoding the information packets to raw frames, adjusting timestamps and other metadata on the raw frames as necessary, and/or passing the raw frames on to the re-encoder tiers.

For example, the decoder 104 may assemble and decode the incoming information (e.g., audio, text, video, metadata) packets, and then forward the information (e.g., in the form of a data stream) to one or more re-encoder tiers, as determined by the MPD controller 106, which monitors the one or more tier controllers 108a . . . 108n.

If decoder 104 is the "null" decoder, it may omit any of the aforementioned operations before forwarding the data on to the re-encoder tiers.

There may be one or more re-encoder tiers that may be provisioned by the MPD controller 106, the re-encoder tiers being associated with separate tiers that are configured for encoding signals and providing an output information stream that is encoded based on characteristics associated with the tier (e.g., to a particular bitrate, having a particular logo, adding subtitles or other overlays).

For example, a re-encoder tier may include or be otherwise associated with a number of virtual transmitters 112a . . . 112n that are assigned to the tier (i.e., a virtual transmitter block 130), be configured to receive raw frames from decoder 104, re-encode them according to various rules (e.g., the worst bitrate and most aggressive glass-to-glass latency (GTG) (e.g., the GTG may affect the encoder configuration) reported by all of the virtual transmitters 112a . . . 112n assigned to its corresponding tier, deliver the encoded frames to the virtual transmitters and/or request the tier controller 108 co-ordinate movement of a virtual transmitter 112 currently in this tier to another one (e.g., the virtual transmitter performance may indicate that the virtual transmitter should be associated with a different tier, such as a higher tier or a lower tier). For ease of management and setup, all receiver endpoints within a tier may be initially set to the same GTG and offsets from this GTG may be applied to an individual transmitter via the receiver endpoint settings or the control portal 150 as required to maintain acceptable video quality within a reasonable range of GTG adjustment.

Each tier controller 108 may be configured to manage interactions with one or more receiver endpoints 114, and creates and associates a corresponding virtual transmitter 112. The tier controllers 108a . . . 108n may include and/or otherwise be associated with one or more tier re-encoders 110a . . . 110n, which may be configured for various encoding and/or other conversion processes in relation to the received (and, in some embodiments, decoded) information received from the source transmitter 102.

Interactions between various receiver endpoints 114 and the virtual transmitters 112a . . . 112n may be governed, for example, using various methods and systems described in U.S. Pat. Nos. 8,873,560 and 8,984,576, which are hereby incorporated by reference in their entirety. For example, a network communication performance profile may be used to split information into multiple data streams to improve transmission of information between devices, and/or a buffer management and transport controller may be utilized to facilitate consistent data reception.

Functionality provided by the tier controller 108 may include forwarding key-frame on demand requests received from the tiers to an upstream component (e.g., the source transmitter 102 or the tier re-encoder 110), decoding IFB packets received from the virtual transmitters, mixing them into a single audio stream, re-encoding the audio stream, and/or switching the audio stream provided to the upstream component (e.g., the source transmitter 102). The tier controller 108 may also track load and report it to various other components (e.g., the MPD controller 106), and/or co-ordinate the movement of a virtual transmitter 112 from one tier to another, and/or handle various requests from the upstream components (e.g., starting a virtual transmission to an endpoint/receiver, by delegating to the downstream branch with the least load, adding another downstream branch, removing an empty downstream branch and transitioning an active stream from level in the hierarchy to another). As outlined above, IFB may also be handled using a separate IFB controller. In this case, the decoding, mixing, re-encoding, switching and management of IFB signals would be handled by the IFB controller instead of the tier controller.

The tier controller 108 may also be configured to manage and/or otherwise control various aspects of the tier re-encoder 110, which re-encodes the stream sent from the decoder 104 for one or more virtual transmitters 112, within the encoding parameters dictated by the tier boundaries, for example at a specific bit rate range (e.g. 5-10 Mbps). In some embodiments, the tier boundaries, and the number of tiers may be determined by the system using various optimization algorithms and techniques. The use of such techniques may be used to increase service efficiency, reduce cost, etc.

In some embodiments, configuration of group/tier properties (e.g., bitrates) may be statically chosen at system start-up, while in other embodiments, a more intelligent (e.g., dynamic, continuously/periodically adjusted) determination may be utilized wherein membership of tiers is automatically/semi-automatically adjusted (e.g., utilizing an error minimization control technique, such as a feedback loop, a PI controller, a P controller, a PID controller, among others). Adjustments may be made based on tracked control parameters, a diversity of control parameters, weighted control parameters, etc.

As an example, where there are constraint is provided wherein a maximum of 3 tiers are supported on a particular machine, the following 5 VTxes are supported: VTx1: 1.5 Mbps, VTx2: 2.0 Mbps, VTx3: 3.5 Mbps, VTx4: 6.0 Mbps, and VTx5: 9.5 Mbps. Choosing 3 tiers may be determined, for example, by choosing 2 of the VTxes in the list as the Tier boundaries. Iterative approaches may be used to determine how the groups and the tier boundaries are selected. For example, as a first "guess", assume that the controller chooses VTx1 as the first boundary, and VTx2 as the second. In this scenario, the three tiers are: Tier1: 0-1.5 Mbps, Tier2: 1.5-2.0 Mbps, and Tier3: 2.0-max Mbps. The overall system "error" in this case would be: =(Tier1 Error)+(Tier2Error)+(Tier3Error)=(1.5−1.5)+(2.0−2.0)+(3.5−2.0+6.0−2.0+9.5−2.0)=(0)+(0)+(1.5+4.0+7.5)=13.0 Mbps.

A possible method would be to exhaustively try all possible "guesses", and select the combination that results in the lowest overall error. Where there are a large number of possible permutations and/or combinations of tiers and tier values, various simulations may be utilized (e.g., exhaustive, non-exhaustive, deterministic, or probabilistic approaches) to determine the potential efficiency gains associated with each permutation/combination, along with their associated trade-offs (e.g., errors, adequacy of encoding parameters). A library of parameters may be stored along with performance (e.g., efficiency) metrics and trade-off (e.g., error) metrics. The library may be computed ahead of time or periodically developed such that the system may have available a set of pre-analyzed options for grouping control, adaptable for particular situations and scenarios, including predicted future situations and scenarios (e.g., adjustment of membership from group to group or provisioning/de-provisioning of encoders may take time to perform and may have to be initiated earlier).

In some embodiments, the adjustment criteria are established to minimizing overall bitrate error and/or to maximizing overall structural similarity (SSIM). For example, the system may be configured determining metrics for re-encoding a video frame at the custom bitrate requested by each VTx (essentially simulating the scenario where the system has enough computational resources to run a tier for each one), for example, determining the SSIM for each of these encoded frames, and calculating the SSIM "error" between these theoretical frame versus the actual video frame that was transmitted by the VTx. In some embodiments, a picture similarity index (PSIM) metric is tracked and controlled for.

If tier re-encoder 110 is the "null" re-encoder, the tier controller 108 may omit any of the aforementioned operations before forwarding the data on to the virtual transmitters 112.

Each virtual transmitter 112 may be paired with a corresponding receiver endpoint 114. The virtual transmitter 112 manages the transmission of the newly re-encoded video stream to at least one receiver endpoint 114, and may be configured to report various transmission characteristics, for example, latency, packet loss, trace-route and/or throughput, back to the tier controller. The virtual transmitter 112 may, in some embodiments, be a cloud based representation of a physical transmitter in the way that it interacts with the receiver (e.g., the receiver interacts with the virtual transmitter the same way it would if it was the physical transmitter; the receiver may not be aware that the virtual transmitter is an abstraction that allows the physical transmitter to efficiently transmit to multiple endpoints). The virtual transmitter 112 may be configured to transfer data to an endpoint 114 by various means, including but not limited to, transfer over a bonded communication link as described in the '560 patent or the '576 patent.

The virtual transmitter 112 may also receive and pass-through control data, IFB, or other content from the receiver endpoint 114, which may be relayed to the transmitter 102. For example, such control data and/or other content may be used for monitoring and cueing purposes, etc.

In some embodiments, the system may be configured to interoperate with a multi-viewer system as described in the '112 application. In such embodiments, each virtual transmitter 112 may be a transmitter selectable by a multi-viewer system (e.g., for shot selection purposes, or remote control purposes, etc.). As such, each virtual transmitter 112 may be configured for the exchange of control signals with a multi-viewer system, in various manners as described in the '112 application.

Low bitrate and/or low frame rate previews may be provided by the transmitter 112 as described in the '112 application and these previews presented to users by way of the control portal 150 for assignment, selection, etc., of video streams for distribution to one or more endpoints.

In some embodiments, the re-encoder 110 in each tier adjusts adaptively to suit the lowest performing receiver in the set, within a pre-set and/or adaptive range, where the range might include parameters such as but not limited to bitrate or latency, or of combinations of such parameters. For example, the characteristics of the encoding may be determined using a cost-optimizer in relation to the number of receivers 114, characteristics of receivers 114, the processing cost (e.g., in cycles) of various encoding processes, the monetary cost associated with various encoding processes, etc. Other embodiments (e.g., using a combination of the two lowest performing receivers in the set or using derived statistics from selected receivers in the set) are also possible.

The components at various levels (e.g., virtual transmitters 112 in a block 130, a re-encoder 110, a tier controller 108, an MPD controller 106) may be configured to report usage and/or issues to various other components and also to the control portal 150. For example, if virtual transmitters 112a . . . 112n are statically assigned with endpoints, usage tracking may be provided at a virtual transmitter level. As another example, if virtual transmitters 112a . . . 112n are dynamically assigned to endpoints, usage tracking may be provided at another level in the hierarchy.

In some embodiments, the system is configured to establish the tiers using historical data (e.g., from a standing start) and initial feedback to configure the virtual transmitters 112a . . . 112n. For example, this data may be used to determine the number of tiers, the segregation between tiers, etc.

In some embodiments, the system may add and remove virtual transmitters 112 throughout the transmission, for example, as receiver endpoints 114 select to receive the video stream or stop receiving the stream.

In some embodiments, the system may be configured to provide IFB from the receive endpoints and IFB switching and/or mixing. In some embodiments, the use of switched IFB would allow different endpoints 114 (e.g. news anchors at one of the stations receiving the transmission) to interact with the transmitters 102 (e.g. a field reporter) through one or more connections between the transmitter 102 and the system that are managed by the MPD controller 106 or a separate IFB controller using the control portal 150.

The system may be implemented using discrete devices, or may be implemented using a distributed networking (e.g., cloud computing) topology. Where a distributed networking implementation is utilized, various resources and components can be virtual or physical. The resources can be provisioned and/or de-provisioned (e.g., spun up, spun down) and may be provided in various geographies (e.g., provisioning a server in the Eastern portion of the United States) and with various associated connections. In some embodiments, the MPD controller 106 and/or tier controllers 108a . . . 108n may be configured to request the provisioning and/or de-provisioning of resources possibly using information and parameters provided by the control portal 150. For example, resource allocation may be determined through reports of aggregate load from the MPD controller 106, and after the additional resource is available, the MPD controller 106 could be configured to coordinate adding the additional resource to a hierarchy of components.

In some embodiments, the endpoint receiver may schedule a time frame in which to request the IFB control channel to the transmitter using the control portal 150. In some embodiments, the IFB channel would be selected on a first-come, first-serve basis. In some embodiments, the control of the IFB channel may be determined at least in part by an outside agent (e.g., the head office of the network providing the transmission) acting through an interface with the MPD controller 106 via the control portal 150.

Where there may be different components that may be separated by distance (e.g., electrically or physically), communications and coordination may require synchronization (e.g., of clocks, timers) as there may be differences in latency, tolerances, variability, etc.

The synchronization may be conducted in various manners, such as at each stage of transmission, for each packet, etc. In some embodiments, clock synchronization between two components may be performed as described in U.S. Pat. No. 9,042,444 to Frusina et al., the contents of which are incorporated by reference. In some embodiments, the system may be configured to maintain latency and clock synchronization between multiple stages of transmission (including decoding, re-encoding, and various steps of transmission) through the cloud.

In this sample scenario, the decoder 104, tier controller 108 and virtual transmitter 112 reside on the same computing resource. In a more complex scenario, the decoder 104 and/or other components may be on separate computing resources.

Figure 5:
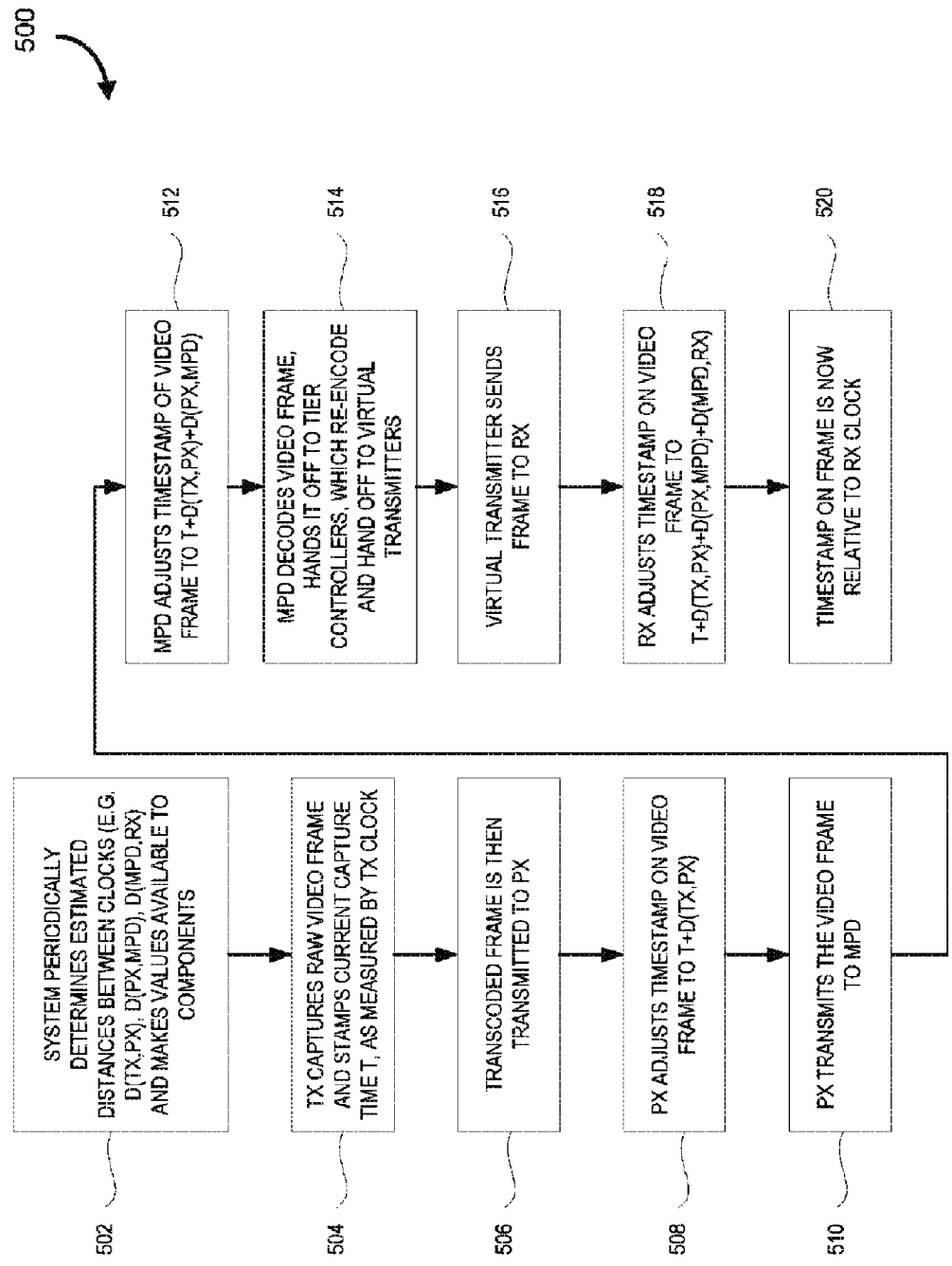
FIG. 5 is a sample workflow diagram illustrating a method for synchronizing clocks, according to some embodiments.

A clock synchronization process may need to be conducted between stages if the deployment is running on different computing resources (physical or virtual). FIG. 5 is a sample workflow diagram 500 illustrating a method for synchronizing clocks, according to some embodiments.

According to some embodiments, in a typical deployment, the following stages may be conducted on different computing resources:
(Tx) transmitter
(Px) proxy
(MPD) decoder, tier controller, virtual transmitter (corresponding to an MPD node 120)
(Rx) receiver Between each of these computing resources, a clock/time synchronization process may be utilized, for example, periodically measuring the distance between the two clocks, which is used to calculate the velocity between the clocks, and used to estimate the distance at a given point in time. Given this set of distance estimates:
d(Tx-to-Px)
d(Px-to-MPD)
d(MPD-to-Rx)

An example is provided relating to a single media (e.g., video) frame as it is transferred through the system. At 502, the system first periodically determines estimated distances between clocks (e.g., d(Tx,Px), d(Px,MPD), d(MPD,Rx) and makes values available to components.

1. At 504, a raw video frame captured by transmitter, and stamped with the current capture time, t, as measured by the transmitter's clock;

2. At 506, the raw video frame is encoded, then transmitted to the proxy;

3. At 508, the proxy adjusts the timestamp on the video frame to: t+d(Tx-to-Px);

4. At 510, the proxy transmits the video frame to the MPD;

5. At 512, the MPD adjusts the timestamp on the video frame to: t+d(Tx-to-Px)+d(Px-to-MPD);

6. At 514, the MPD decodes the video frame, hands it off to the tier controllers 108a . . . 108n, which re-encode and hand it off to the virtual transmitters;

7. At 516, virtual transmitters send the frame to the receiver/endpoints;

8. At 518, the receiver adjusts the timestamp on the video frame from to: t+d(Tx-to-Px)+d(Px-to-MPD)+d(MPD-to-Rx); and 9. At 520, the timestamp is now relative to the receiver/endpoint clock, allowing it to make a potentially more accurate decision of when to play it back with respect to the user's selected latency (e.g., glass to glass (GTG) latency).

In some embodiments, the re-encoding tiers may be formed across multiple axes, to cover parameters such as but not limited to latency, quality, and consistency. Each axis may correspond to one parameter.

In some embodiments, the re-encoding tiers may be chosen and/or optimized to minimize cost of transmission, cost of encoding, or other factors, and/or to maximize picture quality. The optimization of the re-encoding tiers may, for example, be based upon data usage constraints.

In some embodiments, a special "emergency" tier with lower bitrate may be used for poorly performing virtual transmitters, to allow for a minimal transmission to be attempted while performance characteristics are measured and evaluated. This information, for example, may be used for troubleshooting or for determining correct placement of the virtual transmitter.

In some embodiments, metadata may be included in the stream and be passed on to the various endpoints depending on a set of rules. The metadata may provide various elements of information, such as time stamps, geocoding, source and ownership of data within the stream, relationship information (e.g., relationship between the originator of the transmission and the recipient), headers etc., and in some embodiments, the metadata may also be utilized in the determination of groupings, encoding and/or connection monitoring.

In some embodiments, the re-encoding groupings (e.g., tiers) may be determined and/or selected based on one or more overlays to be applied (e.g., automatically) to the re-encoded picture, such as but not limited to a particular network's logo. Other information may be applied, such as subtitles, markings, overlays, alternative audio tracks, closed captioning etc. In these embodiments new re-encoding groupings may be spun-up or spun-down as required to meet demands for new or elimination of unused information. For example, in one embodiment certain groupings spun-up for station or network markings may only exist at certain intervals (e.g. every 10 minutes a grouping is created to display a particular overlay for 10 seconds, and then be spun-down until the next interval with the endpoints in the grouping dispersed to other tiers based on other criteria.

Figure 2A:
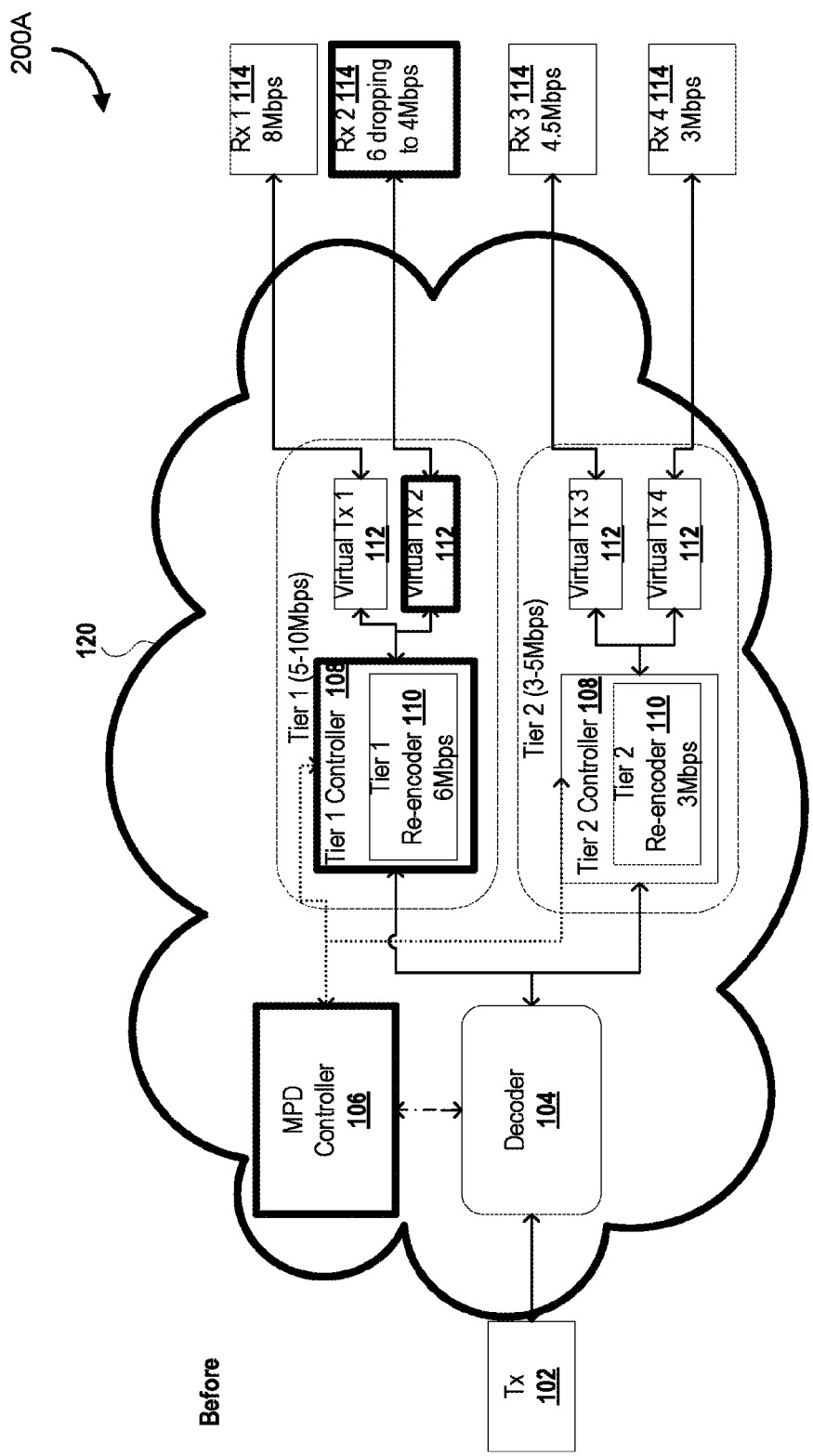
FIGS. 2A and 2B are example before-and-after depictions of a virtual transmitter moving between tiers in the system of FIG. 1, according to some embodiments.
Figure 2B:
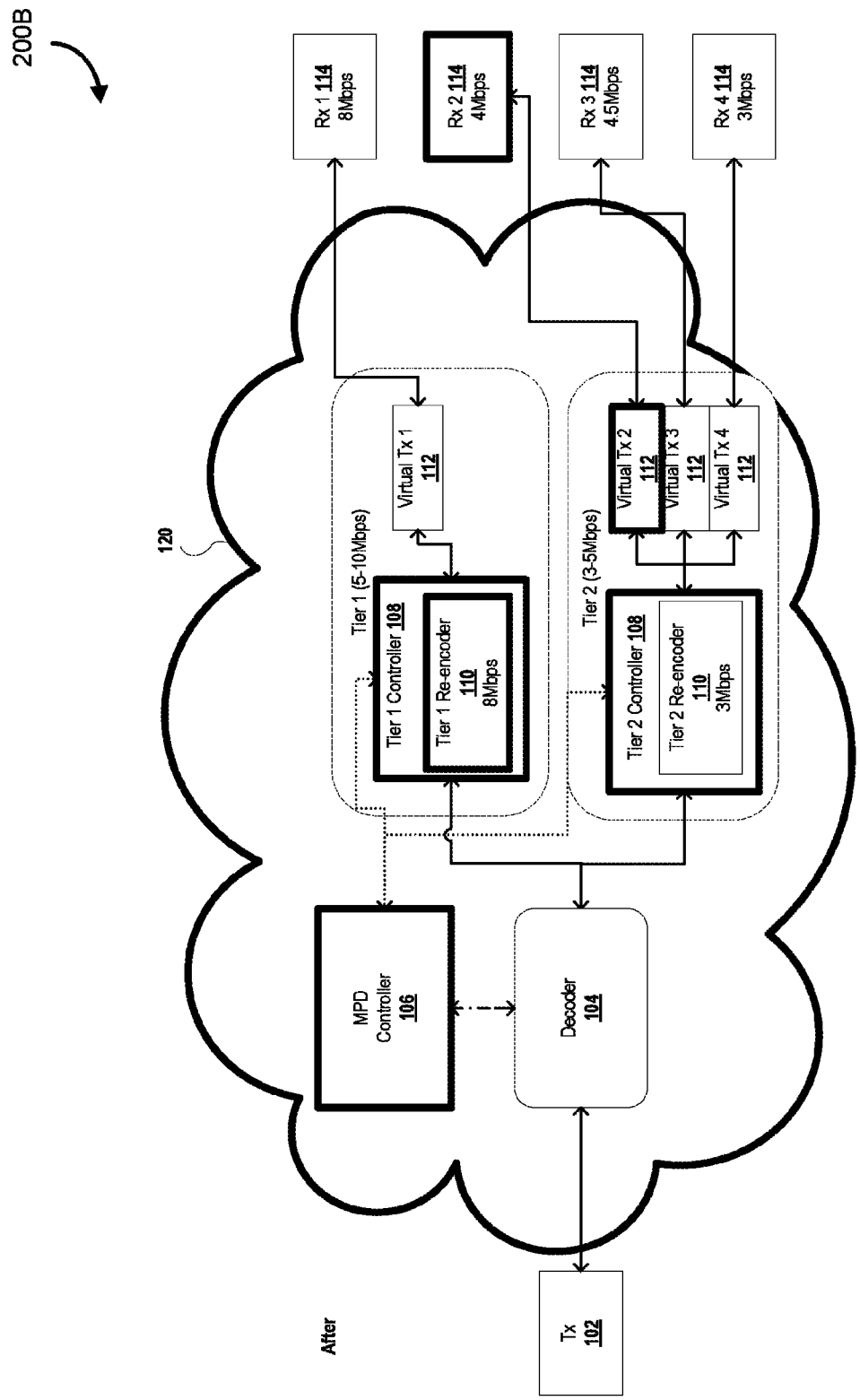

FIGS. 2A and 2B are graphical representations which illustrate a sample before and after depiction of a virtual transmitter moving between tiers, according to some embodiments.

As indicated in FIGS. 2A and 2B, there may be various scenarios where an endpoint, associated virtual transmitter and/or other device may be moved from one group to another group. In this example, the groups are represented as different tiers, each tier corresponding to successively increased bitrates (e.g., as indicated in FIG. 2A, there are two example tiers, Tier 1 (5-10 Mbps), and Tier 2 (3-5 Mbps)).

FIG. 2A is a graphical representation of a schematic diagram 200A before the movement of a virtual transmitter between tiers, according to some embodiments.

Referring now to Tier 1, initially both virtual transmitters are transmitting to corresponding receivers within the bitrate ranges specified for Tier 1. In particular, Virtual Transmitter 1 is transmitting to Receiver 1 at 8 Mbps and Virtual Transmitter 2 is transmitting to Receiver 2 at 6 Mbps. For these transmission rates, Tier 1 Controller controls the Tier 1 Re-encoder to encode video data at the rate of the lowest-performing Virtual Transmitter in the tier, namely, at 6 Mbps to accommodate Virtual Transmitter 2.

Referring now to Tier 2, both virtual transmitters are transmitting to corresponding receivers within the bitrate ranges specified for Tier 2. In particular, Virtual Transmitter 3 is transmitting to Receiver 3 at 4.5 Mbps and Virtual Transmitter 4 is transmitting to Receiver 4 at 3 Mbps. For these transmission rates, Tier 2 Controller controls the Tier 2 Re-encoder to encode video data at the rate of the lowest-performing Virtual Transmitter in the tier, namely, at 3 Mbps to accommodate Virtual Transmitter 4.

As shown in FIG. 2A, the transmission rate of Virtual Transmitter 2 may drop to 4 Mbps, e.g., as a result of reduced transmission capacity in the link(s) (networks) interconnecting Virtual Transmitter 2 and Receiver 2. As this reduced bitrate is outside the range specified for Tier 1, Virtual Transmitter 2 is moved to Tier 2 in manners disclosed herein. The reduced bitrate is within the range specified for Tier 2.

FIG. 2B is a graphical representation of a schematic diagram 200B after the movement of a virtual transmitter between tiers, according to some embodiments. Following this move, Tier 1 Controller controls the Tier 1 Re-encoder to increase its encoding rate. In particular, the encoding rate is increased to 8 Mbps, corresponding to the rate of the new lowest-performing Virtual Transmitter in the tier, i.e., Virtual Transmitter 1.

In some embodiments, the virtual transmitter is able to initiate the movement of the virtual transmitter from one tier to another tier, for example, where the virtual transmitter indicates that characteristics of its transmission are changing (e.g., a higher bitrate is required, a lower bitrate is required), and submits a control signal request to a controller. The controller in this scenario may be configured to coordinate the movement of the virtual transmitter to another tier.

Various steps may be undertaken to move a virtual transmitter from one tier to another. There may be some steps provided to facilitate the transition such that the transition only results in change in the video quality (e.g., there should be no dropped or duplicate frames).

The movement of a virtual transmitter from one tier to another may be based on the following example steps to provide a seamless transition:

Tier signals to the Tier Controller of the desire to move the Virtual Transmitter (in some embodiments, the Tier Controller or the MPD Controller may be configured to monitor various aspects related to the Tier and may initiate a move between tiers);

Tier Controller decides on the new Tier based on the bitrate (or other criteria);

Tier Controller reads the presentation timestamp (PTS) of the next raw frame to be handled by the new tier—(e.g., PTSnew)

Tier Controller reads the PTS of the next frame expected by the Virtual Transmitter to be moved—(e.g., PTSnext)

There may be three cases depending on these values:

PTSnew==PTSnext—The Tier Controller requests a key frame from the new Tier Re-encoder immediately, and the Virtual Transmitter is moved immediately. The Virtual Transmitter starts to receive frames from the new Tier, discarding all old frames until it is provided a frame stamped as PTSnew. For example, the re-encoder might have its own internal buffering (e.g., an encoder could be configured for "lookahead"), and even though a keyframe is requested immediately at PTSnew, and the next frame entering that encoder is at PTSnew, the next frame that comes out of the encoder can be older (PTSnew minus the amount of "lookahead" the encoder is configured for). Accordingly, in some embodiments, all of these old frames would be discarded by the VTx until the encoded frame stamped PTSnew is provided.

PTSnew<PTSnext—The Tier Controller requests a key frame from the new Tier Re-encoder at PTSnext, and the Virtual Transmitter is moved immediately. The Virtual Transmitter starts to receive frames from the new Tier, discarding all old frames until it is provided a frame stamped as PTSnew.

PTSnew>PTSnext—The Tier Controller requests a key frame from the new Tier Re-encoder at PTSnew, and the Virtual Transmitter enters an interim state where it belongs to both tiers. It receives frames from both Tiers, but keeps them in a sorted queue. It continues to receive frames from the old Tier that are stamped between PTSnext and PTSnew. Meanwhile it also receives frames from the new Tier stamped PTSnew and beyond. When the old Tier finally catches up to PTSnew, the Virtual Transmitter is removed from the old Tier, and the queued frames are processed.

A Tier Re-encoder may be configured for periodic key frames instead of key frames on demand. In such a situation, the examples above would change such that the Virtual Transmitter would wait until the next periodic key frame that is >=PTSnext before completing the Tier switch.

For example, when a virtual transmitter is unable to maintain transmission at a minimum level of the tier it is in, it may be adaptively and seamlessly transferred to a lower tier, and be serviced by a different re-encoder using a different set of encoding parameters. Such movement may, in some embodiments, be used to increase transmission efficiency, decrease encoding processing requirements and/or decrease overall costs associated with the transmission of signals.

In some embodiments, some or each network connection present in the virtual transmitter executes a congestion control algorithm that, based on feedback (e.g., real-time or near-real time), decides the bitrate at which it can reliably transmit to the destination. The bitrate determined by this congestion control algorithm is provided back to the controller, which determines whether the VTx should be moved to a different grouping/tier (higher or lower).

The group that the virtual transmitter was in initially may be configured to then adapt by changing its encoding parameters to the value of the new lowest performing receiver. Other types of adaptations may be considered, and this example is provided merely for illustration.

In a similar manner, a virtual transmitter in a lower tier may indicate that it would be able to meet the minimum transmission requirements of a higher tier (through monitoring the attributes of the connection with the receiver endpoint), and may be moved into a higher performing tier.

The higher tier may then be configured to adapt its encoding parameters to reflect the addition of the new virtual transmitter into its rank (presuming the new virtual transmitter was now the lowest performing virtual in the higher tier). Other types of adaptations may be considered, and this example is provided merely for illustration.

Transfer between tiers (or removal/addition from stream entirely) may be performed by sending key frame on demand or by sending one or more key frames on a periodic interval, depending on tier and network conditions, and also by handing off timestamps, and by duplicating packets, or other methods. For example, the system could continue sending frame differences from the initial tier until a key frame from the new tier is received. More specifically, the examples above would change such that the virtual transmitter would wait until the first key frame>=PTSnew, rather than always expecting a key frame right at PTSnew.

During the interim period while the virtual transmitter is waiting for a key frame at PTSnew from the new Tier, it continues to consume frames from the old Tier and transmit them to the Receiver. If the frames from the old Tier cannot be reliably sent to the Receiver (e.g. because the bitrate is too high for the Receiver to support), the Tier switch will not be seamless, and the Virtual Transmitter and Receiver may conceal errors as described in the '560 and '576 patents.

An example tier transfer is described in more detail below.

A problem that may arise in the context of transferring tiers may be that the encoders in the tiers may not be synchronized (e.g., in terms of the PTS) of the media (e.g., video) frame they are currently displaying and/or otherwise processing. This problem may happen as the encoders may be configured differently (e.g. different look ahead values), or simply because of operating system thread scheduling causing the encoders to get slightly different amounts of CPU execution time.

The problem may arise in various contexts, and two sample cases are described below. The first sample case considers a virtual transmitter that wants to move from Tier 1 to Tier 2:

Case 1:
The Tier 1 encoder's current output frame is PTS 1000
The Tier 2 encoder's current output frame is PTS 1005
Virtual transmitter requests a key frame from Tier 2's encoder in preparation for the switch
Assume the key frame comes out from Tier 2 at PTS 1010
So the virtual transmitter must continue to consume frames 1001-1009 from Tier 1 until it is provided and/or receives the key frame from Tier 2 at 1010, where it can finally make the switch.

Case 2:
The Tier 1 encoder's current output frame is PTS 1000
The Tier 2 encoder's current output frame is PTS 990
Virtual transmitter requests an key frame from Tier 2's encoder in preparation for the switch, but requests it to occur for PTS>=1000
Tier 2 waits until the next raw input frame is PTS 1001 before asking the encoder to make it a key frame
Virtual transmitter switches to Tier 2, but discards all frames until PTS 1001

The units in the above example are in those of the nominal video frame duration—(e.g., the PTS was incremented by 1 for each new video frame), but in practice the actual units may be arbitrary (e.g., negotiated/agreed to by the involved parties).

The PTS may be used to synchronize media (e.g., video and/or audio) playback. For example, a video frame stamped with PTS 1000 must be played back at the same time as an audio frame stamped with PTS 1000.

If the new tier controller was on a different machine, handover would indeed be more complicated, for example, as the value of d(MPD-to-Rx) may be changing mid-stream. As part of the hand-over, the new target MPD and Rx may need to synchronize their timing. Then during the handover the Rx would have two values for d(MPD-to-Rx), and would need to know when to switch over from the old value to the new one (essentially on the new key frame).

Figure 3A:
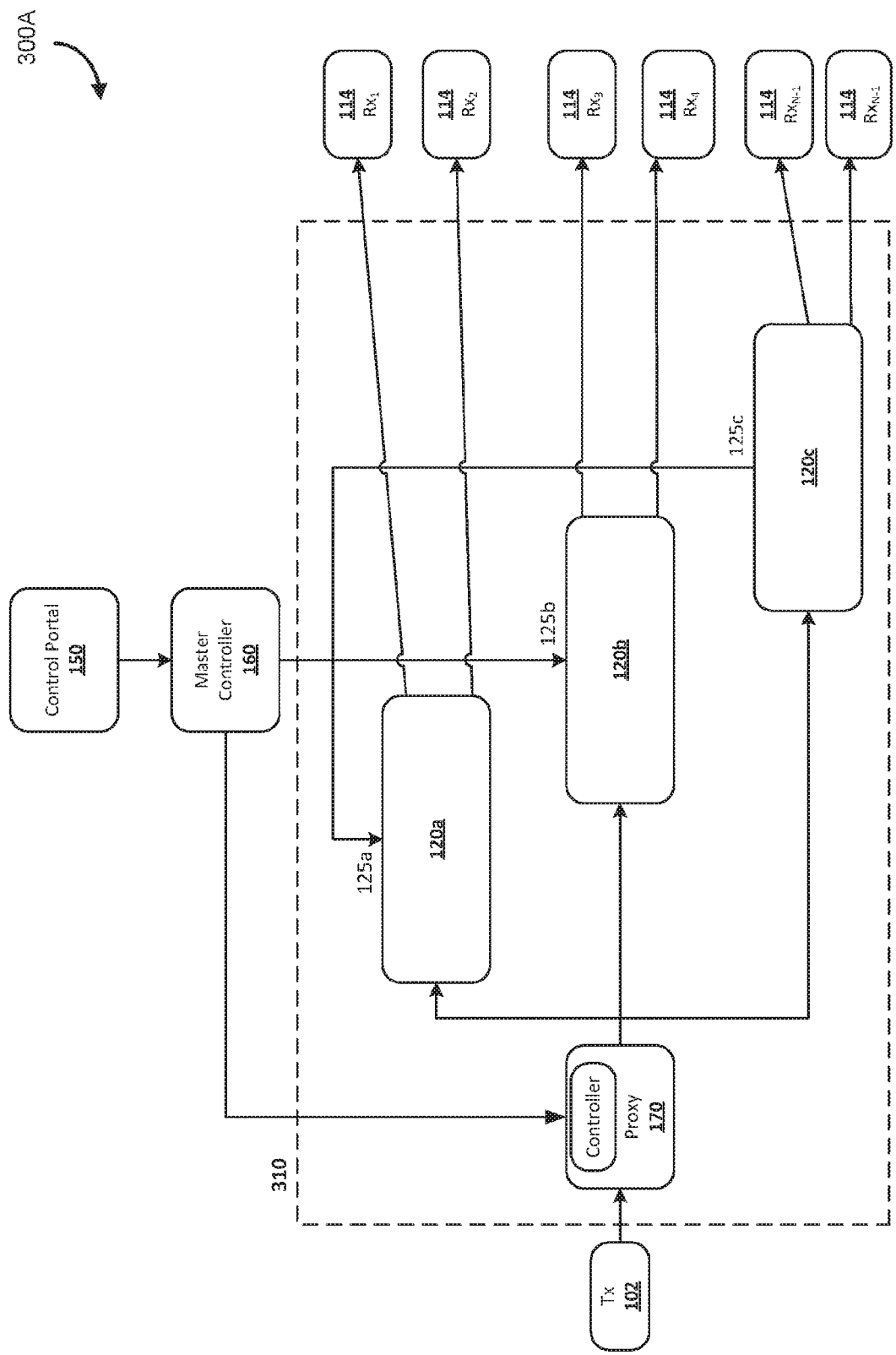
FIGS. 3A, 3B and 3C, are example schematic diagrams of a system with multiple replicated MPD nodes, according to some embodiments.

FIG. 3A is an example schematic diagram 300A of a system scaled to include multiple MPD nodes 120 which are served by a proxy 170, according to some embodiments. The MPD nodes 120 and proxy 170 may collectively be referred to as a proxy-scaled MPD block 310.

The MPD nodes 120 collectively function to distribute data received from a transmitter 102 to endpoints 104. Advantageously, the system of FIG. 3A may allow more endpoints 104 to be serviced than the system of FIG. 1.

Each of the MPD nodes 120 may be controlled by a master controller 160, using user input from a control portal 150. Master controller 160 is configured to control each of the MPD nodes 120, e.g., by distributing control inputs from control portal 150 (e.g., inputs 125a, 125b, and 125c) to appropriate ones of the MPD nodes 120. In particular, the control inputs may be distributed to MPD controllers 106 in the MPD nodes 120. Master controller 160 may also be configured to receive feedback and status data from each of the MPD controllers 106.

Proxy 170 is configured to receive an encoded stream from transmitter 102 and to repeat it to each of the MPD nodes 120, for decoding by a decoder 140 within each of the MPD nodes 120.

In this example, the system may be configured to provide MPD nodes 120 on multiple computing resources (e.g., machines) in different locations (which may improve performance to a transmission by being near to either the transmitter or receiver, or for other reasons), or in environments with network standards (e.g., one decoder may serve endpoints which connect to the cloud via satellite link, and which may have different expectations with respect to latency than for example, a group of endpoints connected through a high-speed fibre line).

Figure 3B:
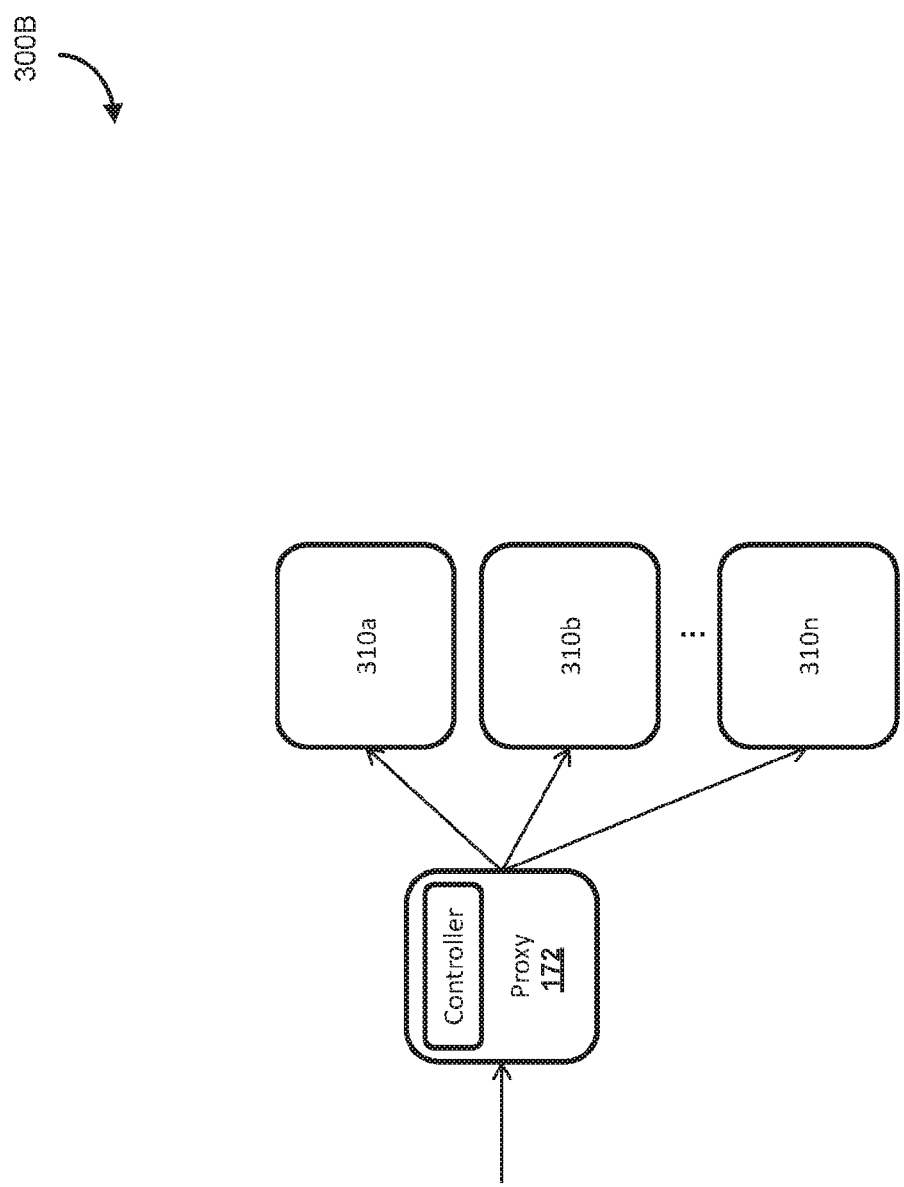

FIG. 3B is an example schematic diagram 300B of a system further scaled to provide multiple proxy-scaled MPD blocks 310. As depicted, the system includes an intermediate proxy 172 connected with a plurality of proxy-scaled MPD blocks 310. Each of the proxy-scaled MPD blocks 310 is configured to service a subset of endpoints 114a . . . n, e.g., endpoints in a particular geographical region, or endpoints having particular transmission/encoding requirements.

The proxy-scaled MPD blocks 310 may be controlled by a master controller 160, e.g., using input from control portal 150. In one example, master controller 160 may control proxy-scaled MPD blocks 310 to redistribute endpoints amongst the blocks 310, and thereby balance the load between blocks 310. Master controller 160 may also cause blocks 310 to be spun up or spun down as required.

Advantageously, the system of FIG. 3B may allow even more endpoints 104 to be serviced than the system of FIG. 3A.

Intermediate proxy 172 is configured to receive an encoded stream from a transmitter 102 and to repeat it to each of the proxy-scaled MPD blocks 310. In particular, each repeated stream is provided to a proxy 170 in a block 310, where it may be further distributed to multiple MPD nodes 120.

Figure 3C:
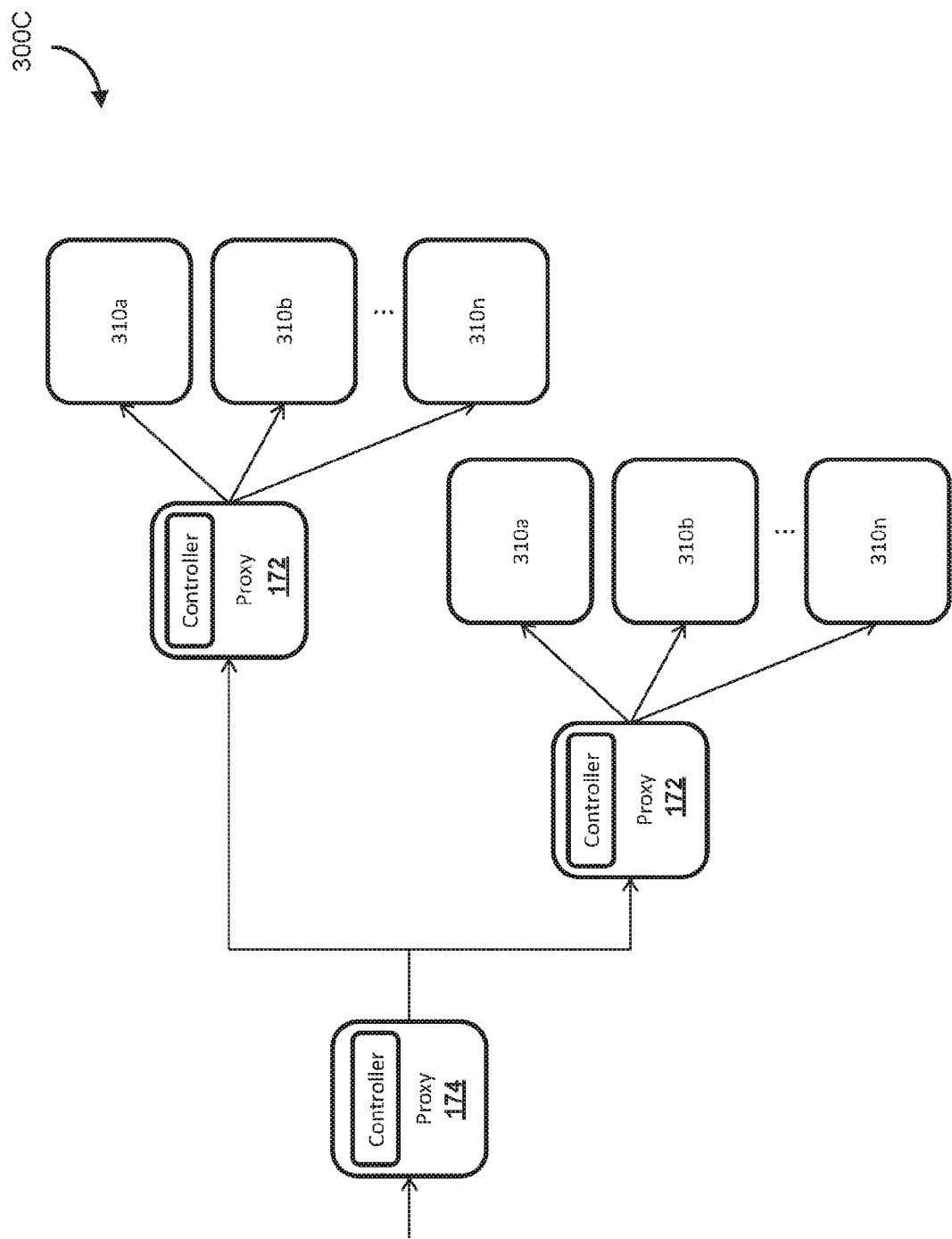

Additional layers of proxies may be provided, e.g., to provide a hierarchy of proxies. For example, FIG. 3C illustrates a hierarchy of proxies 300C including a master proxy 174, intermediate proxies 172, and proxies 170 (within proxy-scaled MPD blocks 310). Master proxy 174 distributes data from a transmitter 102 to multiple intermediate proxies 172. In turn, each intermediate proxy 172 distributes data to multiple proxies 170 (within proxy-scaled MPD blocks 310).

Figure 4A:
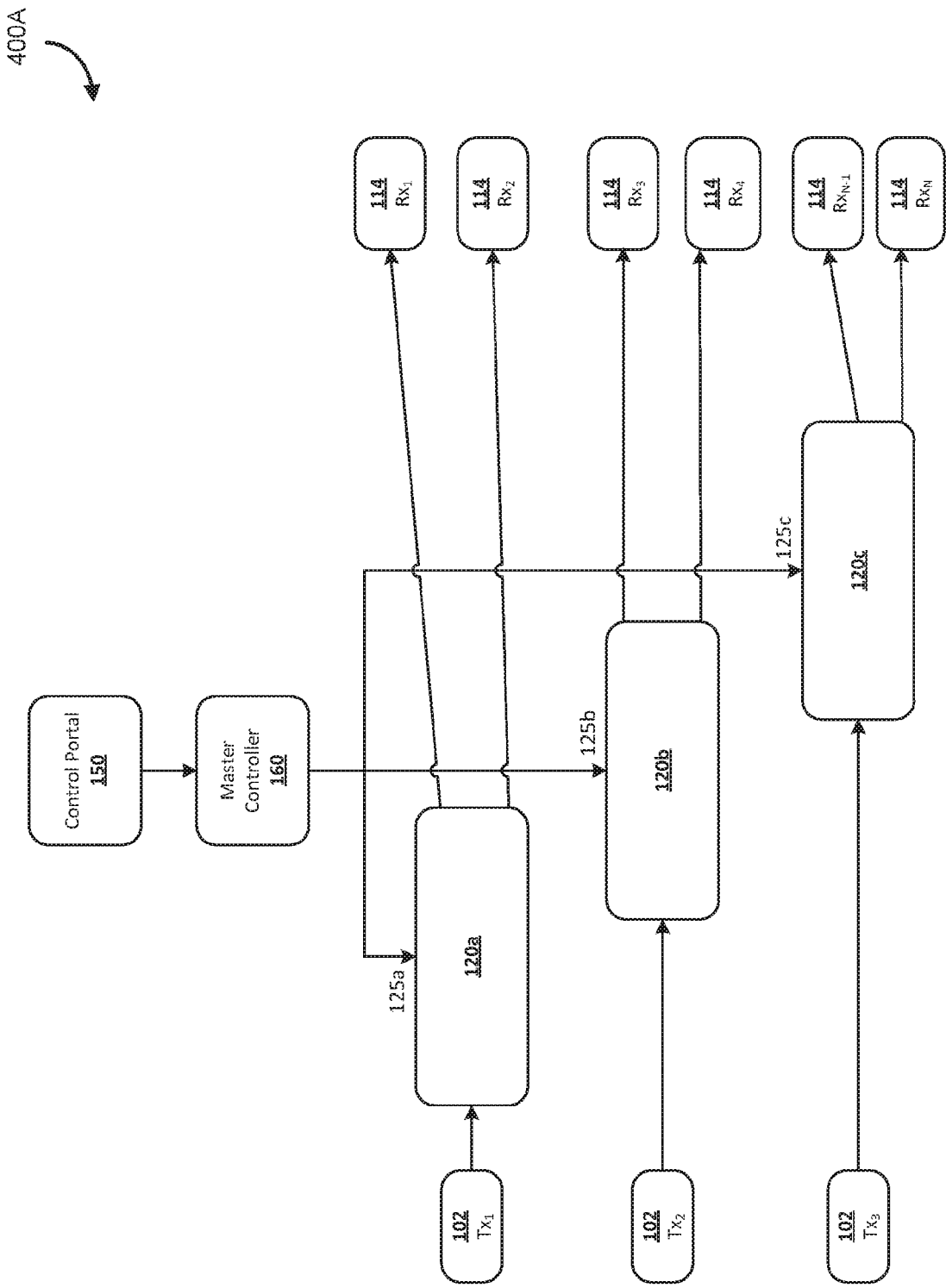
FIG. 4A is an example schematic diagram of a system with multiple transmitters serviced by multiple MPD nodes, according to some embodiments.

FIG. 4A is an example schematic diagram 400A of a system with multiple transmitters 102, according to some embodiments. In the depicted example, each transmitter 102 may be serviced by a respective MPD node 120. Data from each transmitter 102 may be decoded by a decoder 104 in each of the respective MPD nodes 120.

The system may be configured to permit the selection and assignment of transmitters 102 to endpoints 114 in manners disclosed above (e.g., by way of drag-and-drop). The system may also be configured to permit the preview of streams from transmitters 102, including the preview of streams from multiple transmitters 102 at one endpoint 114.

The system may be configured to permit an endpoint 114 to switch from one transmitter 102 to another transmitter 102. For example, such a switch may be performed in response to receiving a user request, which may be issued by way of the multi-viewer system noted above. The requested switch may be provided by re-assigning the endpoint 114 to a new virtual transmitter 112, e.g., a transmitter 112 associated with the newly requested transmitter 102.

Conveniently, there may already be a re-encoder 110 receiving and re-encoding data for the newly requested transmitter 102 (e.g., for transmission to one or more other endpoints 114) in a suitable form (e.g., suitable bitrate and encoding format). In such cases, data from the new transmitter 102 (including data received at an MPD node 120 before the switch is requested) may be transmitted to the endpoint 114, thereby allowing the switch to be effected in a low latency manner.

Figure 4B:
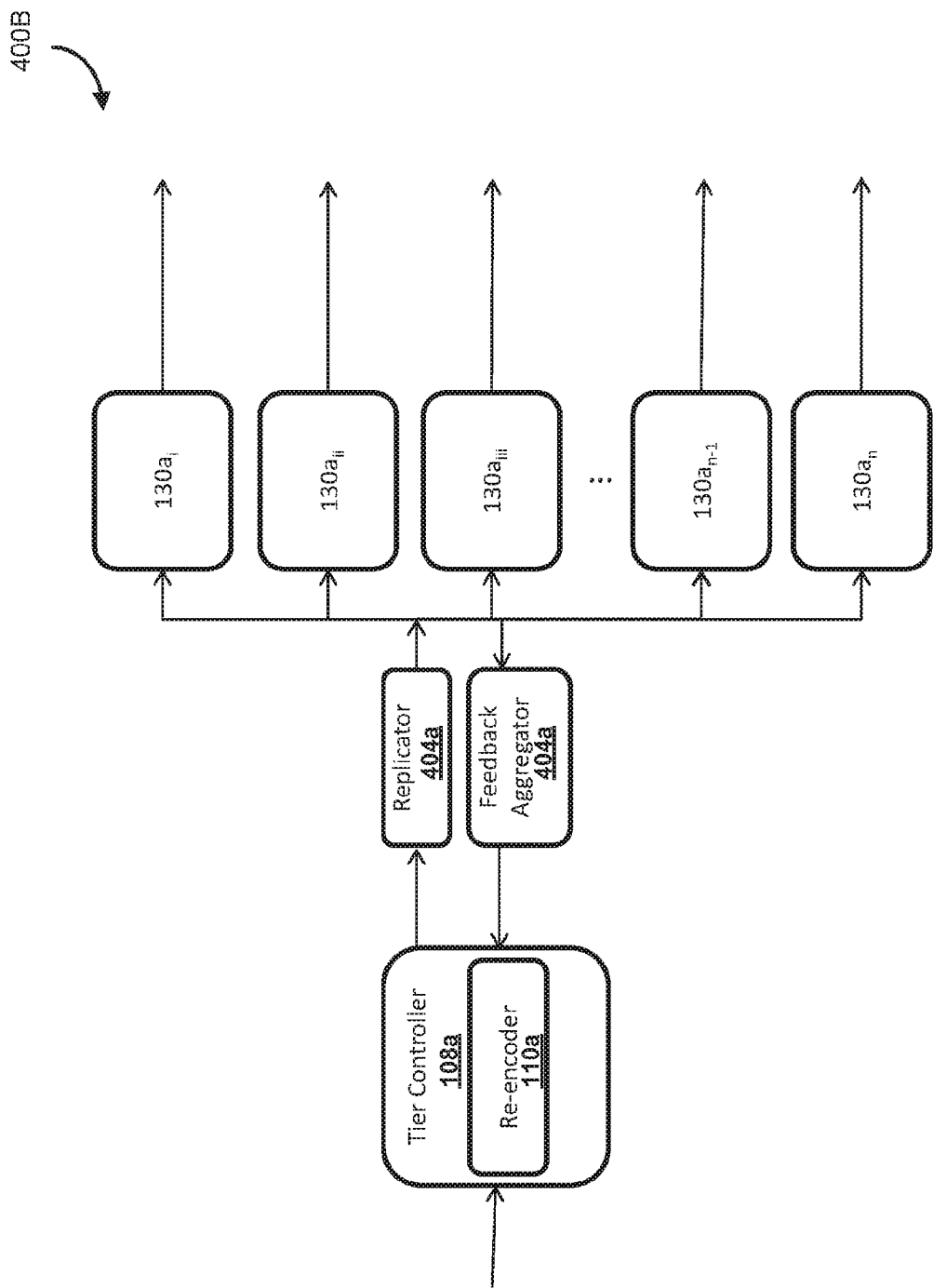
FIG. 4B is an example schematic diagram of a system with multiple replicated virtual transmitter blocks, according to some embodiments.

FIG. 4B is an example schematic diagram 400B of a system with multiple replicated virtual transmitter blocks 130, according to some embodiments.

In some embodiments, there may be multiple virtual transmitter blocks 130 associated with a particular tier. These virtual transmitter blocks 130 may be provisioned or de-provisioned (e.g., in the context of a cloud computing implementation, "spun up" or "spun down") by a tier controller 108 and each of the virtual transmitter blocks 130 may include one or more virtual transmitters 112, each virtual transmitter 112 being configured to communicate data to a corresponding receiver endpoint 114.

In the context of the example depicted in FIG. 4B, tier controller 108a may be associated with a replicator 402a and a feedback aggregator 404a.

The re-encoded data output of the tier controller 108a and the tier re-encoder 110a may be replicated by replicator 402a, which then provides the replicated re-encoded data to one or more virtual transmitter blocks $130a_i \ldots 130a_n$ for transmission to their respective receiver endpoints. In some embodiments, the replicator 402a also transmits various transmission parameters, metadata and/or control signals that may otherwise be provided by tier controller 108a and/or tier re-encoder 110a. Although replicator 402a may be shown in FIG. 4B only for the tier associated with tier controller 108a, there may be other replicators 402 provided for other tiers associated with other tier controllers (e.g., 108b . . . 108n).

A potential benefit of using the replicator 402a to communicate the re-encoded output to the virtual transmitter blocks $130a_i \ldots 130a_n$ is that there may be a reduced and/or eliminated need for the tier re-encoder 110a to transmit information directly to a large number of virtual transmitter blocks $130a_i \ldots 130a_n$. There may also be a reduced and/or eliminated need for each virtual transmitter 112 to be "spun up" or "spun down" individually.

For example, in the context of an implementation where there is a significant number of virtual transmitters being serviced by a single tier re-encoder 110a without a replicator, the performance of the tier re-encoder 110a may be impacted by the need to transmit information to a large number of virtual transmitters in addition to the encoding functions performed by tier re-encoder 110a. Accordingly, a potential benefit of using the replicator 402a may be to improve the scalability of a MPD node 120, enabling the MPD node to service a larger number of receiver endpoints 114.

The feedback aggregator 404a may be provided to receive various feedback information (e.g., signal quality, noise, packet loss, latency) from the virtual transmitter blocks $130a_i \ldots 130a_n$, aggregate the received feedback information and/or provide an aggregate set of feedback information to the tier controller 108a. The feedback aggregator 404a may monitor utilization of the virtual transmitters 112 and/or virtual transmitter blocks $130a_i \ldots 130a_n$ (e.g., which are coupled with various receiver endpoints 114). Although feedback aggregator 404a may be shown in FIG. 4B only for the tier associated with tier controller 108a, there may be other feedback aggregators 404 provided for other tiers associated with other tier controllers (e.g., 108b . . . 108n).

The tier controller 108a may utilize the feedback information in managing and/or controlling the operation of the replicator 402a, the feedback aggregator 404a, the number of virtual transmitter blocks $130a_i \ldots 130a_n$, and/or the membership of the virtual transmitters in the virtual transmitter blocks $130a_i \ldots 130a_n$.

The tier controller 108 may be configured to control various aspects of the operation of the replicator 402, the virtual transmitter blocks $130a_i \ldots 130a_n$, and/or the virtual transmitters 112. For example, the tier controller 108 may determine the number of virtual transmitter blocks required to service the virtual transmitters, for example, dynamically "spinning up" and/or "spinning down" resources (e.g., virtual transmitter blocks), changing the membership of virtual transmitters from one virtual transmitter block to another (e.g., changing the distribution of virtual transmitters), performing load balancing across various virtual transmitter blocks (e.g., re-allocating virtual transmitters between virtual transmitter blocks to promote an even distribution of virtual transmitters), etc.

The membership of virtual transmitters in virtual transmitter blocks may be based on various factors, such as geography (e.g., grouping together all the virtual transmitters for receiver endpoints on the East coast of the United States in one or more virtual transmitter blocks), transmission characteristics (e.g., latency, packet loss), etc.

In some embodiments, the transfer of virtual transmitters between physical machines may be performed during a live stream for the purposes of load distribution or failover. For example, the system may determine that there is a large number of endpoints and/or virtual transmitters associated with a particular group (e.g., or tier), which may indicate that the encoder and/or transmission links associated with that group may be under a relatively larger load.

In some embodiments, where one or more encoders fail and/or other components fail and/or have performance issues, the system may be configured to invoke a transfer of endpoints from one or more groups to other one or more groups.

In one example, the system may contain stations which may each serve as both a transmitter 102 and a receiver endpoint 114, as a transmitter 102 only, or as a receiver endpoint 114 only. In one embodiment, this system is configured to allow a group of stations to transfer data, including but not limited to live video data, from station to station by way of the cloud, potentially reducing and/or eliminating the need for costly point to point video transmission systems, and allowing transfer through various networks, such as the Internet.

In some embodiments, the system may be implemented in part, or in full, by a set of distributed computing devices connected through a communications network. An example of such a set of distributed computing devices would be what is typically known as a 'cloud computing' implementation. In such a network, a plurality of connected devices operate together to provide services through the use of their shared resources.

A cloud-based implementation for distributing information may provide one or more advantages including: openness, flexibility, and extendibility; manageable centrally; reliability; scalability; on-demand provisioning; being optimized for computing resources; being optimized for latency; among others. While embodiments and implementations may be discussed in particular non-limiting examples with respect to use of the cloud to implement aspects of the system platform, a local server, a single remote server, a software as a service platform, or any other computing device may be used instead of the cloud. In some embodiments, where the encoders are provided as cloud-based resources, new encoders may be provisioned where necessary to establish new tiers in a dynamic manner when required. Conversely, encoders that are no longer necessary may also be de-provisioned and returned into cloud resources. In some embodiments, encoders are provided in the form of a physical encoder farm, from which encoder resources are provisioned from and/or de-provisioned to, depending on the need of a system. For example, a controller may determine that to increase efficiency, a new tier may need to be established (e.g., a current tier spans too large a range of bitrates and is thus sub-optimally encoding), and a new encoder may be provisioned from the encoder farm.

Figure 7:
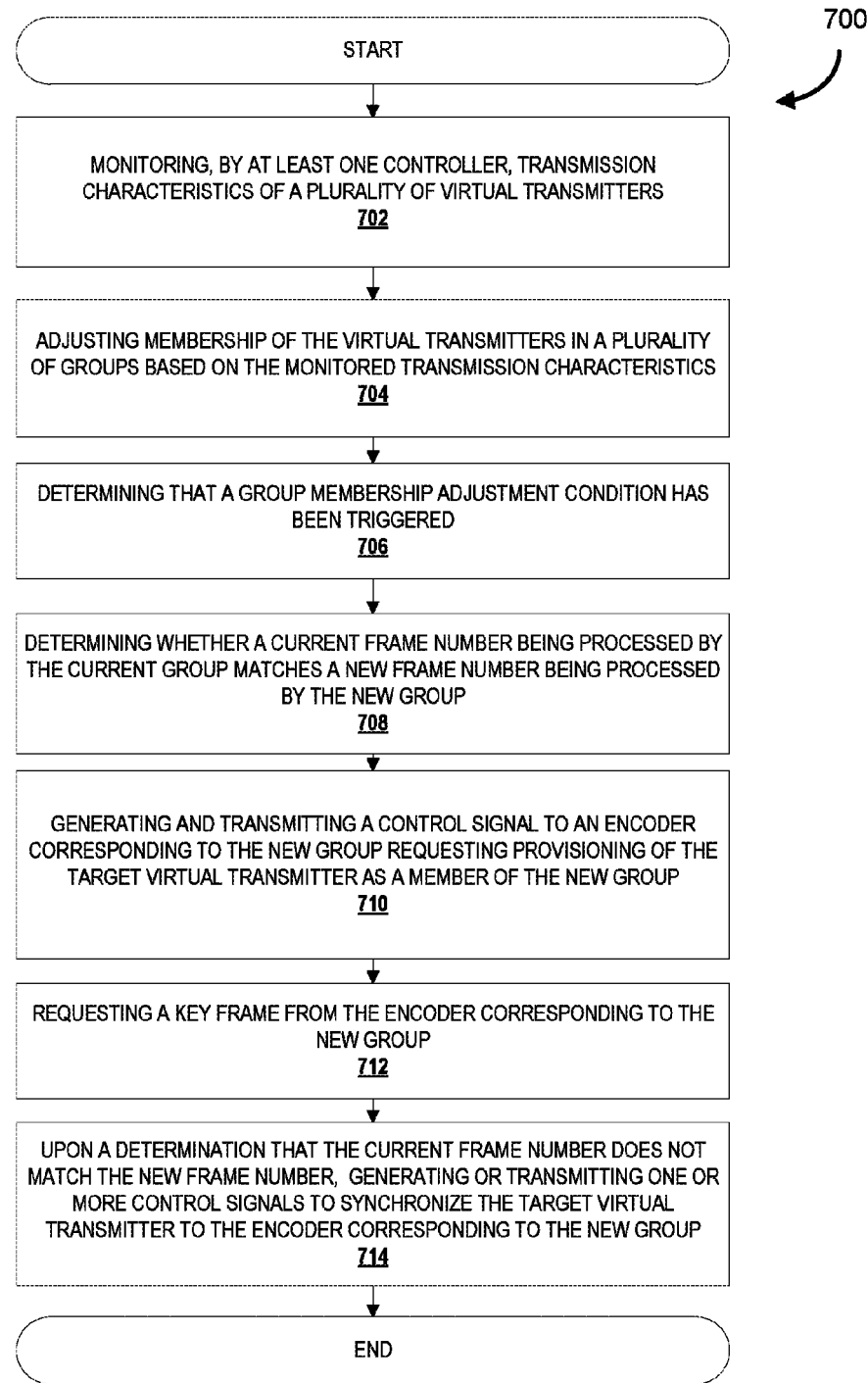
FIG. 7 is a workflow illustrative of a method for distributing data with multi-tiered encoding, according to some embodiments.

FIG. 7 is an example workflow illustrating steps that may be taken to move a virtual transmitter from one tier to another, according to some embodiments. As illustrated in workflow 700, various steps are illustrated and there may be more, different, alternate, or less steps, and the steps may be taken in various permutations, combinations, and/or sub-combinations. For example, the steps may be taken out of the order depicted, with various steps substituted and/or otherwise omitted.

At 702, the controller is configured to monitor transmission characteristics of the plurality of virtual transmitters and at 704, to adjust membership of the virtual transmitters in the plurality of groups (e.g., ranked tiers) based on the monitored transmission characteristics. In some embodiments, transmission characteristics may include bitrates, latency, packet loss, QoS, communication link quality, signal-to-noise ratio, among others.

The controller is configured to dynamically adjust the membership of the virtual transmitters in the plurality of groups, for example, based on the monitored transmission characteristics. A potential benefit may be the ability to adaptively adjust to changing channel conditions and/or network conditions. For example, a virtual transmitter may be determined to have superior transmission characteristics relative to its peers in its tier and thus is a candidate for promotion to a better encoding tier. Conversely, inferior transmission characteristics may lead to a demotion to a lower tier. Accordingly, the adjustment of membership helps ensure that virtual transmitters are grouped into groups that are fit for purpose (e.g., matched based on the transmission characteristics). In some embodiments, a weighted combination of the transmission characteristics is utilized (e.g., weighted indicative of the relative importance of the contribution of each of the transmission characteristics to the quality of transmission and/or channel capacity).

At 706, upon a determination that a group membership adjustment condition has been triggered (e.g., latency has grown above a particular value, packet loss is greater than a predefined threshold, latency has been low for a predefined period of time), the controller determines a new group for a target virtual transmitter that is currently a member of a current group, the new group based on the monitored transmission characteristics.

At 708, the controller tracks a current frame number being processed by the current group and checks to see if it matches a new frame number being processed by the new group; generate and at 710 transmits a control signal to an encoder corresponding to the new group requesting provisioning of the target virtual transmitter as a member of the new group.

At 712, the controller requests a key frame from the encoder corresponding to the new group; and upon a determination that the current frame number does not match the new frame number at 714, generate or transmit one or more control signals to synchronize the target virtual transmitter to the encoder corresponding to the new group.

Figure 8:
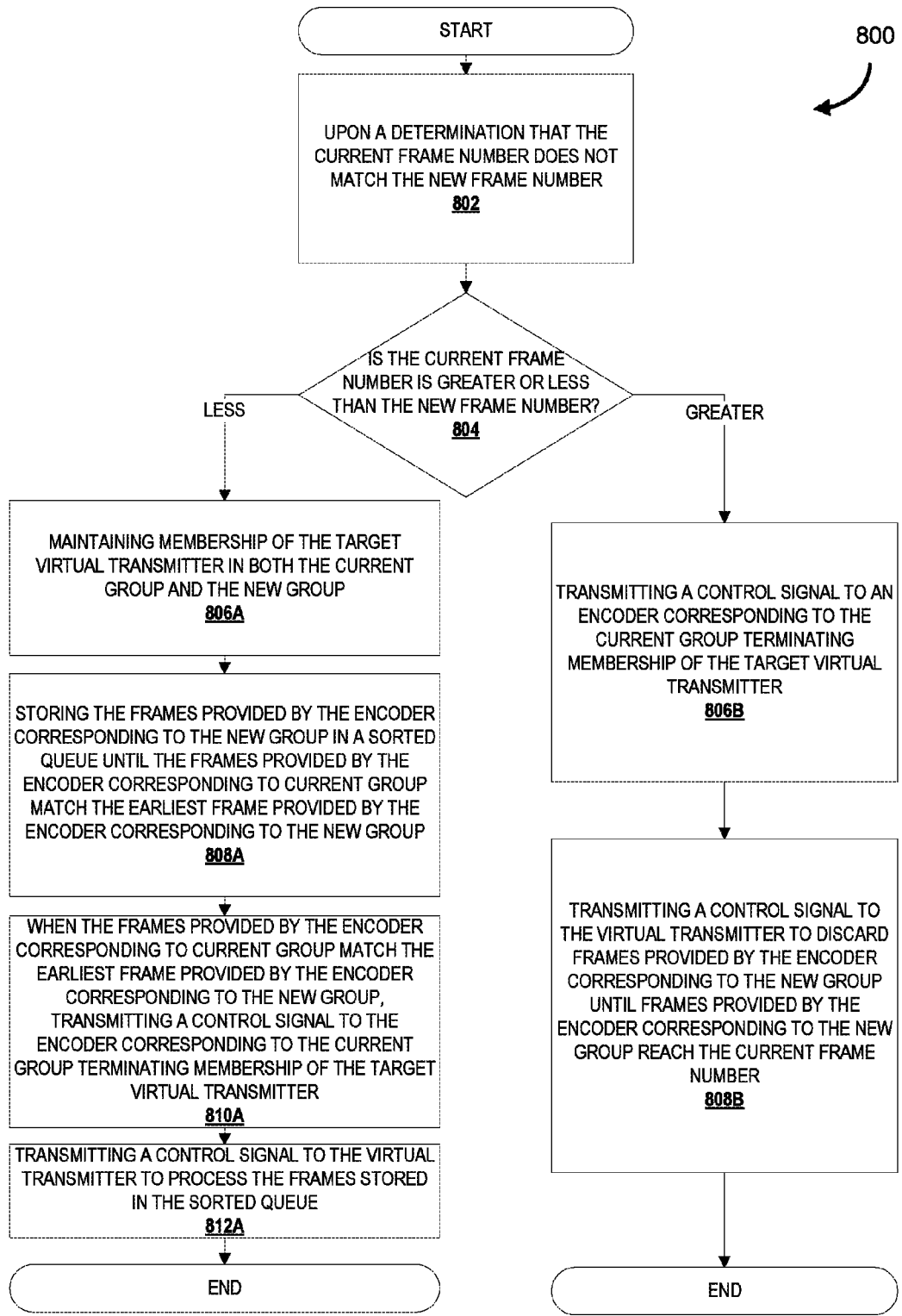
FIG. 8 is a workflow illustrative of a method for adjusting a virtual transmitter between two different tiers, according to some embodiments.

FIG. 8 is an example workflow illustrating steps that may be taken for synchronizing a move of the virtual transmitter from one tier to another, according to some embodiments. As illustrated in workflow 800, various steps are illustrated and there may be more, different, alternate, or less steps, and the steps may be taken in various permutations, combinations, and/or sub-combinations. For example, the steps may be taken out of the order depicted, with various steps substituted and/or otherwise omitted.

Upon a determination that the current frame number does not match the new frame number at 802, the controller checks if the current frame number is greater or less than the new frame number at 804. One of the challenges with dynamically transitioning virtual transmitters between tiers is that there is a risk of inadvertently causing "skipping" as the frames being transferred by the encoders for each tier may not be synchronized. This may result in a suboptimal experience as the transition is no longer seamless, and a potential loss of information. As described below, some aspects include steps for synchronization to be taken as part of the transition process.

To synchronize the virtual transmitter when the current frame number is greater than the new frame number, the at least one controller is configured at 806B to transmit a control signal to an encoder corresponding to the current group terminating membership of the target virtual transmitter and at 808B transmit a control signal to the virtual transmitter to discard frames provided by the encoder corresponding to the new group until frames provided by the encoder corresponding to the new group reach the current frame number.

To synchronize the virtual transmitter when the current frame number is less than the new frame number, the at least one controller is configured to at 806A maintain membership of the target virtual transmitter in both the current group and the new group and at 808A store the frames provided by the encoder corresponding to the new group in a sorted queue until the frames provided by the encoder corresponding to current group match the earliest frame provided by the encoder corresponding to the new group.

At this time, the controller at 810A is configured to transmit a control signal to the encoder corresponding to the current group terminating membership of the target virtual transmitter and at 812A to transmit a control signal to the virtual transmitter to process the frames stored in the sorted queue.

Control signals may be in the form of a notification sent through an application programming interface, a function call, machine-level instruction sets, object code, etc. In some embodiments, an interface is updated to indicate the transition of tiers to either an end user (e.g., associated with the virtual transmitter) or to an operator of the controller.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein may provide for more efficient encoding, better utilization of communication links, more responsive adaptations to changing communications demands and/or network conditions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Figure 6:
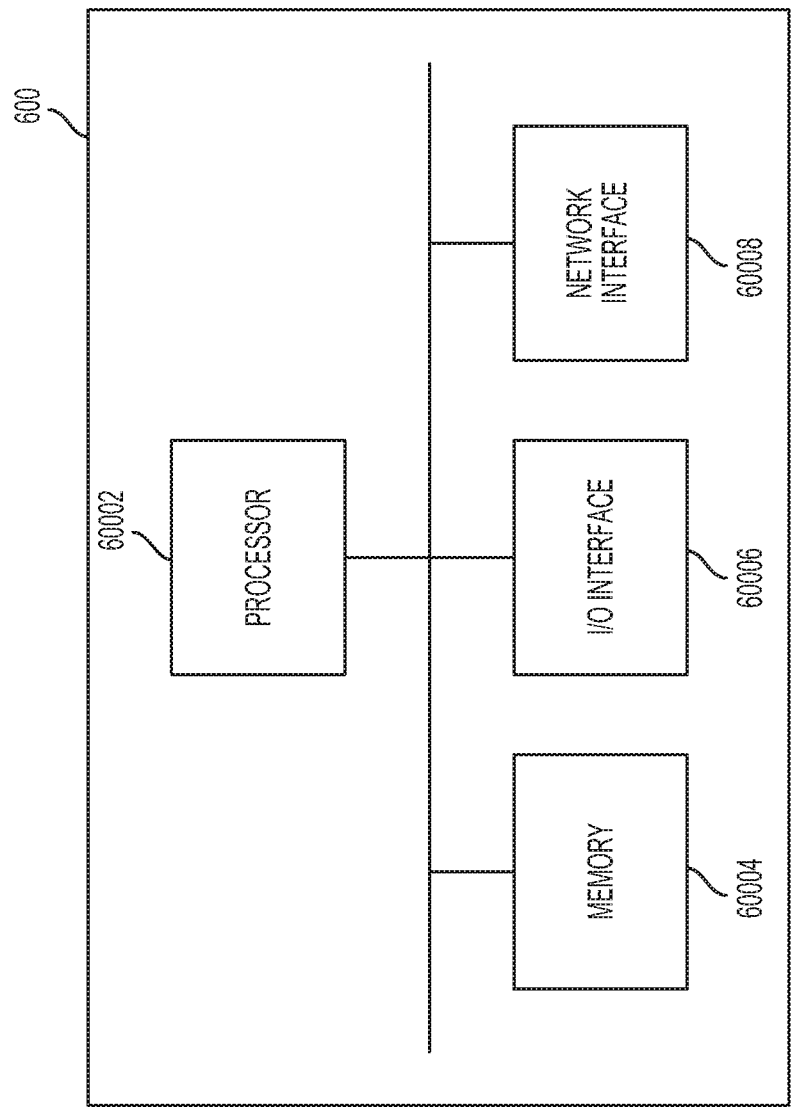
FIG. 6 is a schematic of a computing device, according to some embodiments.

For simplicity only one computing device 600 is shown in FIG. 6 but the system may include more computing devices 600 operable by users to access remote network resources 600 and exchange data. The computing devices 600 may be the same or different types of devices. The computing device 600 at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or various computing devices capable of being configured to carry out the methods described herein.

FIG. 6 is a schematic diagram of a computing device 600, exemplary of an embodiment. As depicted, computing device 600 includes at least one processor 60002, memory 60004, at least one I/O interface 60006, and at least one network interface 60008.

Each processor 60002 may be, for example, various types of microprocessor or microcontroller, a digital signal processing (DSP) processor, an integrated circuit, a field programmable gate array (FPGA), a reconfigurable processor, a programmable read-only memory (PROM), or any combination thereof.

Memory 60004 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 60006 enables computing device 600 to interconnect with one or more input devices, such as a keyboard, mouse, camera, touch screen and a microphone, or with one or more output devices such as a display screen and a speaker.

Each network interface 60008 enables computing device 600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., W-Fi, WiMAX), SS7 signaling network, fixed line, local area network, wide area network, and others, including any combination of these.

Computing device 600 may be operable to register and authenticate users (using a login, unique identifier, and password for example) prior to providing access to applications, a local network, network resources, other networks and network security devices. Computing devices 600 may serve one user or multiple users.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

As can be understood, the examples described above and illustrated are intended to be exemplary only.

What is claimed is:

1. A system for transmission of data streams to a plurality of endpoints, the system comprising:
a plurality of encoders, each encoder configured to encode a data stream according to at least one encoding parameter;
a plurality of virtual transmitters organized into a plurality of groups based on at least one transmission characteristic;
each group of virtual transmitters configured to receive encoded data from an associated one of the encoders;
each virtual transmitter of the plurality of virtual transmitters configured to transmit the encoded data to an associated one of the plurality of endpoints; and
at least one controller configured to monitor transmission characteristics of the plurality of virtual transmitters and to adjust membership of the virtual transmitters in the plurality of groups based on the monitored transmission characteristics.

2. The system of claim 1, wherein at least some of the groups correspond to ranked tiers, ranked according to the at least one transmission characteristic.

3. The system of claim 2, wherein the at least one controller is configured to adjust the membership of the virtual transmitters in the plurality of groups, the at least one controller being configured to:
upon a determination that a group membership adjustment condition has been triggered, determine a new group for a target virtual transmitter that is currently a member of a current group, the new group based on the monitored transmission characteristics;
determine whether a current frame number being processed by the current group matches a new frame number being processed by the new group;
generate and transmit a control signal to an encoder corresponding to the new group requesting provisioning of the target virtual transmitter as a member of the new group;
request a key frame from the encoder corresponding to the new group; and
upon a determination that the current frame number does not match the new frame number, generate or transmit one or more control signals to synchronize the target virtual transmitter to the encoder corresponding to the new group.

4. The system of claim 3, wherein to synchronize the virtual transmitter when the current frame number is greater than the new frame number, the at least one controller is configured to: transmit a control signal to an encoder corresponding to the current group terminating membership of the target virtual transmitter and transmit a control signal to the virtual transmitter to discard frames provided by the encoder corresponding to the new group until frames provided by the encoder corresponding to the new group reach the current frame number.

5. The system of claim 3, wherein to synchronize the virtual transmitter when the current frame number is less than the new frame number, the at least one controller is configured to: maintain membership of the target virtual transmitter in both the current group and the new group and store the frames provided by the encoder corresponding to the new group in a sorted queue until the frames provided by the encoder corresponding to current group match the earliest frame provided by the encoder corresponding to the new group, upon which the at least one controller is configured to transmit a control signal to the encoder corresponding to the current group terminating membership of the target virtual transmitter and to transmit a control signal to the virtual transmitter to process the frames stored in the sorted queue.

6. The system of claim 1, wherein each encoder of the plurality of encoders is configured to encode the data stream according to a lowest transmission characteristic among the plurality of virtual transmitters that are members of the group corresponding to the encoder.

7. The system of claim 1, wherein the at least one controller is configured to monitor load conditions, each load condition associated with an encoder of the plurality of encoders, and upon detecting load conditions greater than a predetermined load condition value, to provision a new encoder and a corresponding new group, and to adjust membership of the virtual transmitters in the plurality of groups such that the virtual transmitters are distributed substantially evenly amongst the plurality of groups.

8. The system of claim 1, further comprising a decoder configured to decode data received from a data source, and to provide the decoded data to each of the plurality of encoders.

9. The system of claim 1, further comprising a plurality of decoders, each associated with at least one of plurality of encoders, each of the decoders configured to decode data received from a data source, and to provide the decoded data to the associated encoders.

10. The system of claim 1, wherein the at least one transmission characteristic comprises at least one of: a bitrate, a latency, an encoding error rate relative to individual encoding, a structural similarity metric, a picture similarity index, and a packet loss rate.

11. A computer-implemented method for transmission of data streams to a plurality of endpoints, the method comprising:
- monitoring, by at least one controller, transmission characteristics of a plurality of virtual transmitters; and
- adjusting membership of the virtual transmitters in a plurality of groups based on the monitored transmission characteristics;
- wherein a plurality of encoders are each configured to encode a data stream according to at least one encoding parameter, and the plurality of virtual transmitters are organized into the plurality of groups based on at least one monitored transmission characteristic;
- wherein each group of virtual transmitters is configured to receive encoded data from an associated one of the encoders; and each virtual transmitter of the plurality of virtual transmitters is configured to transmit the encoded data to an associated one of the plurality of endpoints.

12. The method of claim 11, wherein at least some of the groups correspond to ranked tiers, ranked according to the at least one transmission characteristic.

13. The method of claim 12, wherein adjusting the membership of the virtual transmitters in the plurality of groups, further includes:
- upon a determination that a group membership adjustment condition has been triggered, determining a new group for a target virtual transmitter that is currently a member of a current group, the new group based on the monitored transmission characteristics;
- determining whether a current frame number being processed by the current group matches a new frame number being processed by the new group;
- generating and transmitting a control signal to an encoder corresponding to the new group requesting provisioning of the target virtual transmitter as a member of the new group;
- requesting a key frame from the encoder corresponding to the new group; and
- upon a determination that the current frame number does not match the new frame number, generating or transmitting one or more control signals to synchronize the target virtual transmitter to the encoder corresponding to the new group.

14. The method of claim 13, wherein to synchronize the virtual transmitter when the current frame number is greater than the new frame number, the method comprises:
- transmitting a control signal to an encoder corresponding to the current group terminating membership of the target virtual transmitter and transmitting a control signal to the virtual transmitter to discard frames provided by the encoder corresponding to the new group until frames provided by the encoder corresponding to the new group reach the current frame number.

15. The method of claim 13, wherein to synchronize the virtual transmitter when the current frame number is less than the new frame number, the method comprises:
- maintaining membership of the target virtual transmitter in both the current group and the new group;
- storing the frames provided by the encoder corresponding to the new group in a sorted queue until the frames provided by the encoder corresponding to current group match the earliest frame provided by the encoder corresponding to the new group;
- when the frames provided by the encoder corresponding to current group match the earliest frame provided by the encoder corresponding to the new group, transmitting a control signal to the encoder corresponding to the current group terminating membership of the target virtual transmitter; and
- transmitting a control signal to the virtual transmitter to process the frames stored in the sorted queue.

16. The method of claim 11, wherein each encoder of the plurality of encoders is configured to encode the data stream according to a lowest transmission characteristic among the plurality of virtual transmitters that are members of the group corresponding to the encoder.

17. The method of group 11, further comprising: monitoring load conditions, each load condition associated with an encoder of the plurality of encoders; and upon detecting load conditions greater than a predetermined load condition value, provisioning a new encoder and a corresponding new group, and adjusting membership of the virtual transmitters in the plurality of groups such that the virtual transmitters are distributed substantially evenly amongst the plurality of groups.

18. The method of claim 11, further comprising a decoder configured to decode data received from a data source, and to provide the decoded data to each of the plurality of encoders.

19. The method of claim 11, further comprising a plurality of decoders, each associated with at least one of plurality of encoders, each of the decoders configured to decode data received from a data source, and to provide the decoded data to the associated encoders.

20. The method of claim 11, wherein the at least one transmission characteristic comprises at least one of: a bitrate, a latency, an encoding error rate relative to individual encoding, a structural similarity metric, a picture similarity index, and a packet loss rate.

* * * * *

UNITED STATES PATENT AND TRADEMARK OFFICE
CERTIFICATE OF CORRECTION

PATENT NO. : 9,800,903 B2
APPLICATION NO. : 15/095002
DATED : October 24, 2017
INVENTOR(S) : David Sze et al.

It is certified that error appears in the above-identified patent and that said Letters Patent is hereby corrected as shown below:

In the Claims

Column 32, Line 27, Claim 17:
"The method of group 11"
Should read:
-- The method of claim 11 --

Signed and Sealed this
Nineteenth Day of June, 2018

Andrei Iancu
*Director of the United States Patent and Trademark Office*